US008948627B2

(12) United States Patent
Ishizaki

(10) Patent No.: US 8,948,627 B2

(45) **Date of Patent: *Feb. 3, 2015**

(54) LOAD ABNORMALITY DETECTION APPARATUS PERFORMING ACCURATE JUDGMENT OF CAUSE OF ABNORMALITY

(75) Inventor: Yuusuke Ishizaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 719 days.

This patent is subject to a terminal disclaimer.

(21) Appl. No.: 13/230,977

(22) Filed: Sep. 13, 2011

(65) Prior Publication Data

US 2012/0070168 A1 Mar. 22, 2012

(30) Foreign Application Priority Data

Sep. 16, 2010 (JP) ................................ 2010-208585
Sep. 2, 2011 (JP) ................................ 2011-191401

(51) Int. Cl.
*G03G 15/00* (2006.01)
*H02P 6/12* (2006.01)
*G03G 15/16* (2006.01)

(52) U.S. Cl.
CPC .. *G03G 15/1615* (2013.01); *G03G 2215/00156* (2013.01); *G03G 15/1605* (2013.01); *G03G 2215/00168* (2013.01)
USPC ....................................... 399/36; 318/418.15

(58) Field of Classification Search
CPC G03G 15/0189; G03G 15/1615; G03G 15/55
USPC ........................... 399/36; 318/400.15, 400.21
See application file for complete search history.

(56) References Cited

U.S. PATENT DOCUMENTS

| | | | | |
|---|---|---|---|---|
| 7,733,041 | B2 | 6/2010 | Ishizaki | |
| 8,543,017 | B2 * | 9/2013 | Ishizaki | 399/36 |
| 2008/0298856 | A1 | 12/2008 | Koike | |
| 2013/0343772 | A1 * | 12/2013 | Ishizaki | 399/36 |

FOREIGN PATENT DOCUMENTS

| | | |
|---|---|---|
| JP | 2003-166135 | 6/2003 |
| JP | 2005-164678 | 6/2005 |
| JP | 2006-042483 | 2/2006 |
| JP | 2007-164093 | 6/2007 |
| JP | 2009-009103 | 1/2009 |

* cited by examiner

*Primary Examiner* — Erika J Villaluna

(74) *Attorney, Agent, or Firm* — IPUSA, PLLC

(57) ABSTRACT

A load abnormality detection apparatus detects a load abnormality in first and second rotational members acting on each other. An inclination calculation part calculates an inclination of a second control element. A first comparison part compares a first control element with a first threshold value and also with a second threshold value larger than the first threshold value. A second comparison part compares an inclination of change in the second control element with a third threshold value of a negative value and also with a fourth threshold value of a positive value. An abnormality detection part detects a load abnormality in a load applied to the first rotational member and the second rotational member based on results of comparison by the first comparison part and the second comparison part and identifies a cause of the detected load abnormality.

20 Claims, 21 Drawing Sheets

FIG.7

| TIME(S) | SECOND DRIVE CURRENT(A) |
|---|---|
| 1 | 1.55 |
| 2 | 1.55 |
| 3 | 1.55 |
| 4 | 1.56 |
| 5 | 1.56 |
| 6 | 1.56 |
| 7 | 1.57 |
| 8 | 1.57 |
| 9 | 1.57 |
| 10 | 1.57 |
| ⋮ | ⋮ |
| 100 | 1.81 |

LOAD ABNORMALITY DETECTION APPARATUS PERFORMING ACCURATE JUDGMENT OF CAUSE OF ABNORMALITY

BACKGROUND OF THE INVENTION

1. Field of the Invention

The present invention relates to a technique to judge a cause of an abnormality generated in a structure having a plurality of motors acting with each other.

2. Description of Related Art

Japanese Laid-Open Patent Applications No. 2003-166135 and No. 2006-042483 suggest a technique to detect an abnormality in a load applied to a motor. In this abnormality detection technique, it is judged that an abnormality occurs in a load applied to a motor when a detected current flowing through the motor exceeds a threshold value. Japanese Laid-Open Patent Applications No. 2003-166135 also discloses a technique to detect an existence of an abnormality from changes in a value of the current flowing through for the purpose of detecting an abnormality in a load being applied to the motor.

The technology in which an existence of abnormality in a load is determined based on only whether a current value exceeds a threshold value is effective in a case where the load is driven independently. However, for example, in a case where an intermediate transfer belt and a secondary transfer roller of an image forming apparatus that are driven by separate drive sources, it may be difficult to make an accurate determination because interference between the belt and the roller may give influences to the load conditions of both the belt and the roller. For example, if an intermediate transfer belt and a surface of a secondary roller are rotationally moved at the same speed and if the secondary roller expands due to a temperature rise, the intermediate transfer belt may be moved together with the secondary transfer roller because the moving speed of the surface of the secondary transfer belt is increased even when the drive motors for driving the intermediate transfer belt and the secondary transfer roller are controlled to maintain the same speed. In such a case, the load applied to the drive motor for driving the secondary transfer roller is increased by an amount corresponding to a force to move the secondary transfer roller. On the other hand, the drive motor for driving the intermediate transfer belt is decreased by an amount corresponding to the force given by the secondary transfer roller. Hereinafter, such a phenomenon that the secondary transfer roller is partially moved by the first transfer belt is referred to as “move together”.

Because of the influence of interference mentioned above, if, for example, an abnormality occurs that the load of the intermediate transfer belt is decreased, it is difficult to accurately determine whether the abnormality is caused by only a change in the load of the intermediate transfer belt or the expansion of the secondary transfer roller. If an accurate determination cannot be made, an appropriate control cannot be performed when such an abnormality occurs.

SUMMARY OF THE INVENTION

It is a general object of the present invention to provide a load abnormality detection apparatus and method in which the above-mentioned problems are eliminated.

A more specific object of the present invention is to provide a load abnormality detection technique which can accurately determine a cause of a load abnormality in a structure of rotating rotational members, which are rotated by separate drive sources while being brought into contact with each other.

In order to achieve the object, there is provided according to one aspect of the present invention a load abnormality detection apparatus that detects a load abnormality in at least one of a first rotational member and a second rotational member provided in an apparatus including: the first rotational member and the second rotational member that contact each other directly or via a recording medium interposed therebetween; a first motor that drives the first rotational member and is controlled based on a first control element; and a second motor that drives the second rotational member and is controlled based on a second control element, the load abnormality detection apparatus comprising: an element acquisition part configured to acquire the first control element and the second control element; an inclination calculation part configured to calculate an inclination of change in the second control element; a first comparison part configured to compare the first control element with a first threshold value and also compare the first control element with a second threshold value larger than the first threshold value; a second comparison part configured to compare an inclination of change in the second control element with a third threshold value, which is a negative value, and also compare the inclination of change in the second control element with a fourth threshold value, which is a positive value; and an abnormality detection part configured to detect a load abnormality in a load applied to at least one of the first rotational member and the second rotational member based on results of comparison by the first comparison part and the second comparison part and identify a cause of the detected load abnormality.

Additionally, there is provided according to another aspect of the present invention a load abnormality detection apparatus that detects a load abnormality in at least one of a first rotational member and a second rotational member provided in an apparatus including: the first rotational member and the second rotational member that contact each other directly or via a recording medium interposed therebetween; a first motor that drives the first rotational member and is controlled based on a first control element; and a second motor that drives the second rotational member and is controlled based on a second control element, the load abnormality detection apparatus comprising: an element acquisition part configured to acquire the first control element and the second control element; an inclination calculation part configured to calculate an inclination of change in the second control element; a first comparison part configured to compare the first control element with a first threshold value and also compare the first control element with a second threshold value larger than the first threshold value; a second comparison part configured to determine whether the inclination of change in the second control element is a positive value or zero or a negative value, and compare an absolute value of the inclination of change in the second control element with a seventh threshold value, which is a positive value; and an abnormality detection part configured to detect a load abnormality in a load applied to at least one of the first rotational member and the second rotational member based on results of comparison by the first comparison part and the second comparison part and identify a cause of the detected load abnormality.

Additionally, there is provided according to another aspect of the present invention an image forming apparatus comprising the above-mentioned load abnormality detection apparatus; an intermediate transfer belt configured to serve as the first rotation member; and a secondary transfer roller configured to serve as the second rotation member.

Additionally, there is provided according to yet another aspect of the present invention a computer readable recording medium storing a program to cause a computer to function as the above-mentioned load abnormality detection apparatus.

Other objects, features and advantages of the present invention will become more apparent from the following detailed description when read in conjunction with the accompanying drawings.

BRIEF DESCRIPTION OF THE DRAWINGS

FIG. 7 is an illustration for explaining storage of valued of a second drive current;

DETAILED DESCRIPTION OF THE PREFERRED EMBODIMENTS

A description will be given below, with reference to the drawings, of embodiments of the present invention.

Figure 1:
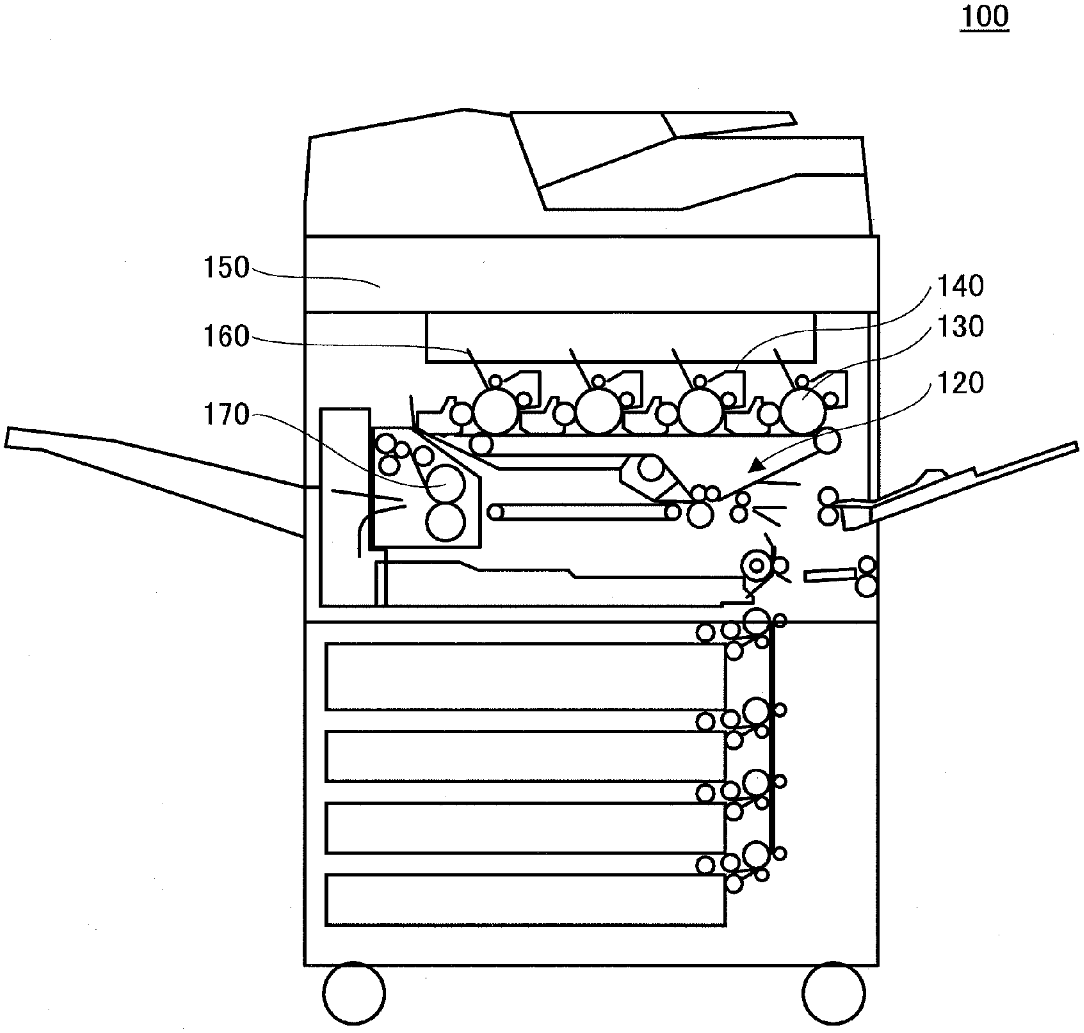
FIG. 1 is an illustration of an entire structure of an image forming apparatus according to an embodiment of the present invention.

FIG. 1 is an illustration of an outline structure of an image forming apparatus according to an embodiment of the present invention. In the image forming apparatus 100, a scanner part 150 reads an original document by irradiating a scanning light onto the original document and receiving a reflected light from the original document by a 3-line CCD sensor. Image data obtained by reading the original document is subjected to a scanner γ correction process, a color conversion process, an image separation process, a gradation correction process, etc., in an image processing unit. The processed image data is sent to an image writing unit 160. The image writing unit 160 generates a laser beam by a laser diode (LD) and modulates the laser beam according to the image data. A photoconductor unit 130 projects the laser beam onto a uniformly charged surface of a photoconductor drum to form a latent image on the uniformly charged surface. A development unit 140 develops the latent image by supplying a toner to the photoconductor drum. A toner image formed on the photoconductor drum is transferred onto a transfer belt of an intermediate transfer unit of a paper transfer part 120. In a case of a full-color copy, toner images of four colors (black (Bk), cyan (C), magenta (M), yellow (Y)) are formed on four conductive drums, respectively, and the four color toner images are sequentially transferred to the intermediate transfer belt one on another to form a full-color toner image. After the full-color toner image is formed, a transfer paper is fed from a paper supply part in synchronization with the intermediate transfer belt. Then, the paper transfer part 120 transfers the full-color toner image from the intermediate transfer belt to the transfer paper. The transfer paper having the full-color toner image thereon is conveyed to the fixing part 170 through a conveyance part 180. The fixing part 170 fixes the full-color toner image on the transfer paper by heating. Then, the transfer paper is ejected onto a paper eject tray. Although the above-mentioned color copy machine 100 is an image forming apparatus of an indirect transfer type, the present invention may be applied to an image forming apparatus of a direct transfer type.

Figure 2:
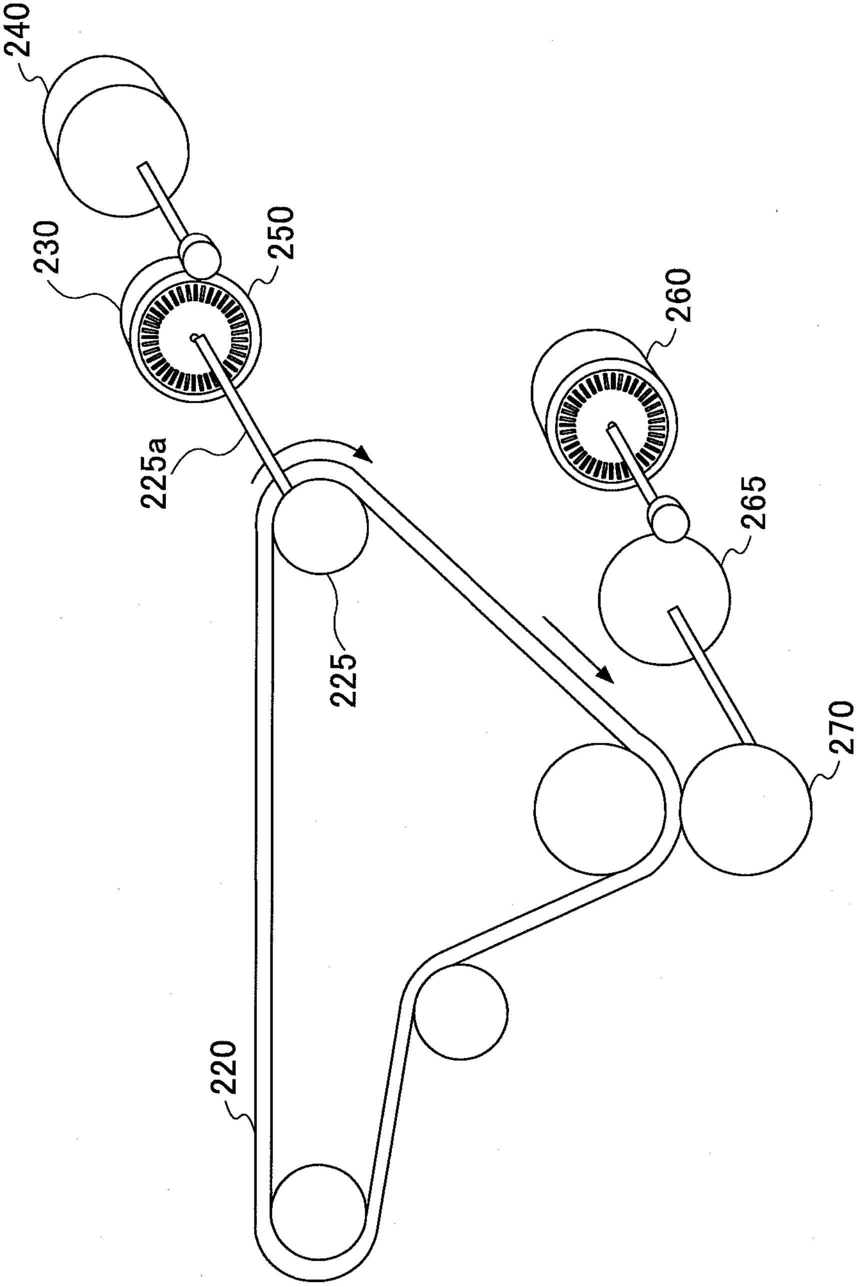
FIG. 2 is an illustration of a structure of a paper transfer part.

FIG. 2 is an illustration indicating a structure of the paper transfer part 120. An intermediate transfer belt 220 is driven by an intermediate transfer motor 240. A reduction mechanism 230 is provided between the intermediate transfer motor 240 and an intermediate transfer belt drive roller 225 so that a motor axis speed is transmitted to the intermediate transfer belt drive roller 225 by being reduced according to a gear reduction ratio of the reduction mechanism 230.

The secondary transfer roller 270 is driven by a secondary transfer drive motor 260. A reduction mechanism 265 is provided between a secondary transfer drive motor 260 and a secondary transfer roller 270. A control is performed based on detection values of an encoder 250 provided to the intermediate transfer belt drive roller axis 225*a* and a belt sensor (not illustrated in the figure) so that a belt surface of the intermediate transfer belt 220 moves at a fixed speed.

In the following description, the intermediate transfer belt 220 corresponds to a first rotational member, and the secondary transfer roller 270 corresponds to a second rotational member. The intermediate transfer motor 240 corresponds to a first motor, and the secondary transfer drive motor 260 corresponds to a second motor. Accordingly, the first rotational member and the second rotational member are brought into contact with each other.

In the following description, the load abnormality detection apparatus according to the present embodiment detects load abnormalities generated in the intermediate transfer belt 220 and the secondary transfer roller 270. However, a load abnormality detected by the load abnormality detection apparatus according to the present embodiment is not limited to an abnormality generated in the intermediate transfer belt 220 and the secondary transfer roller 270. The load abnormality detection apparatus according to the present embodiment may detect a load abnormality generated in loads applied to the first rotational member and the second rotational member that are in contact with each other.

First Embodiment

A description will be given below of a first embodiment of the present invention. In the first embodiment, a drive current (first drive current) supplied to the intermediate transfer motor 240 is set as a first control element (or a first parameter), and a drive current (a second drive current) supplied to the secondary transfer motor 260 is set as a second control element (or a second parameter).

Figure 3:
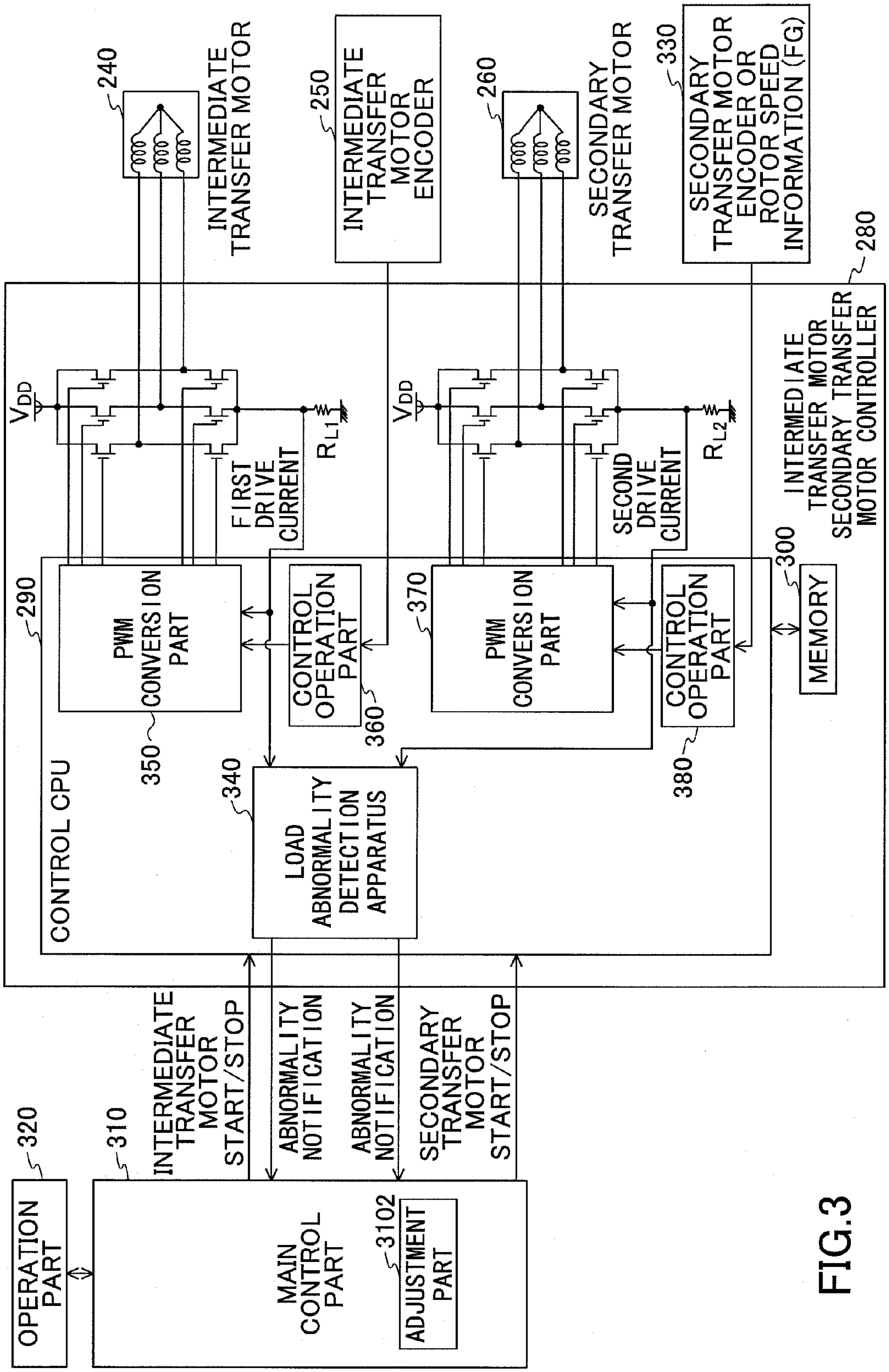
FIG. 3 is a functional block diagram of a main control part and a motor control part of a load abnormality detection apparatus according to a first embodiment of the present invention.

A description will be given first of functions of a main control part and a motor control part of the image forming apparatus according to the first embodiment. FIG. 3 is a functional block diagram of the main control part 310 and the motor control part 280.

The main control part 310 sends a start signal, a rotation direction signal, etc., to a control CPU 290 of the motor control part 280. The motor control part 280 drives the intermediate transfer motor 240 by supplying a drive current to the intermediate transfer motor 240 and drives the secondary transfer motor 260 by supplying a drive current to the secondary transfer motor 260. In the following description, the drive current supplied to the intermediate transfer motor 240 is referred to as a "first drive current", and a drive current supplied to the secondary transfer motor 260 is referred to as a "second drive current".

The speed of the intermediate transfer motor 240 is feedback controlled based on a speed signal output from the encoder 250 of the intermediate transfer motor 240. The speed of the secondary transfer motor 260 is feedback controlled based on a speed signal output from the encoder 330 of the secondary transfer motor 260. The first drive current and the second drive current can be measured, respectively, by providing shunt resistors $R_{L1}$ and $R_{L2}$ to drive circuit transistors (FETs), respectively. For example, a voltage between the shunt resistor $R_{L1}$, and the drive circuit transistor for driving the intermediate transfer motor 240 is sent to an AD input part of the control CPU 290, and the control CPU 290 can compute the first drive current using the voltage supplied through the AD input part. Similarly, a voltage between the shunt resistor $R_{L2}$ and the drive circuit transistor for driving the secondary transfer motor 260 is sent to an AD input part of the control CPU 290, and the control CPU 290 can compute the second drive current using the voltage supplied through the AD input part.

Control operation parts 360 and 380 compute and determine torque command values based on speed information supplied from the encoder 250 of the intermediate transfer motor 240 and the encoder 330 of the secondary transfer motor 260, respectively. The first drive current and the second drive current are input into PWM conversion parts 350 and 370, respectively. The PWM conversion parts 350 and 370 limit the pulse width modulation duty (PWM Duty) at a time of generation of an over-current (there is no direct relation with a determination according to a torque command value).

Figure 4:
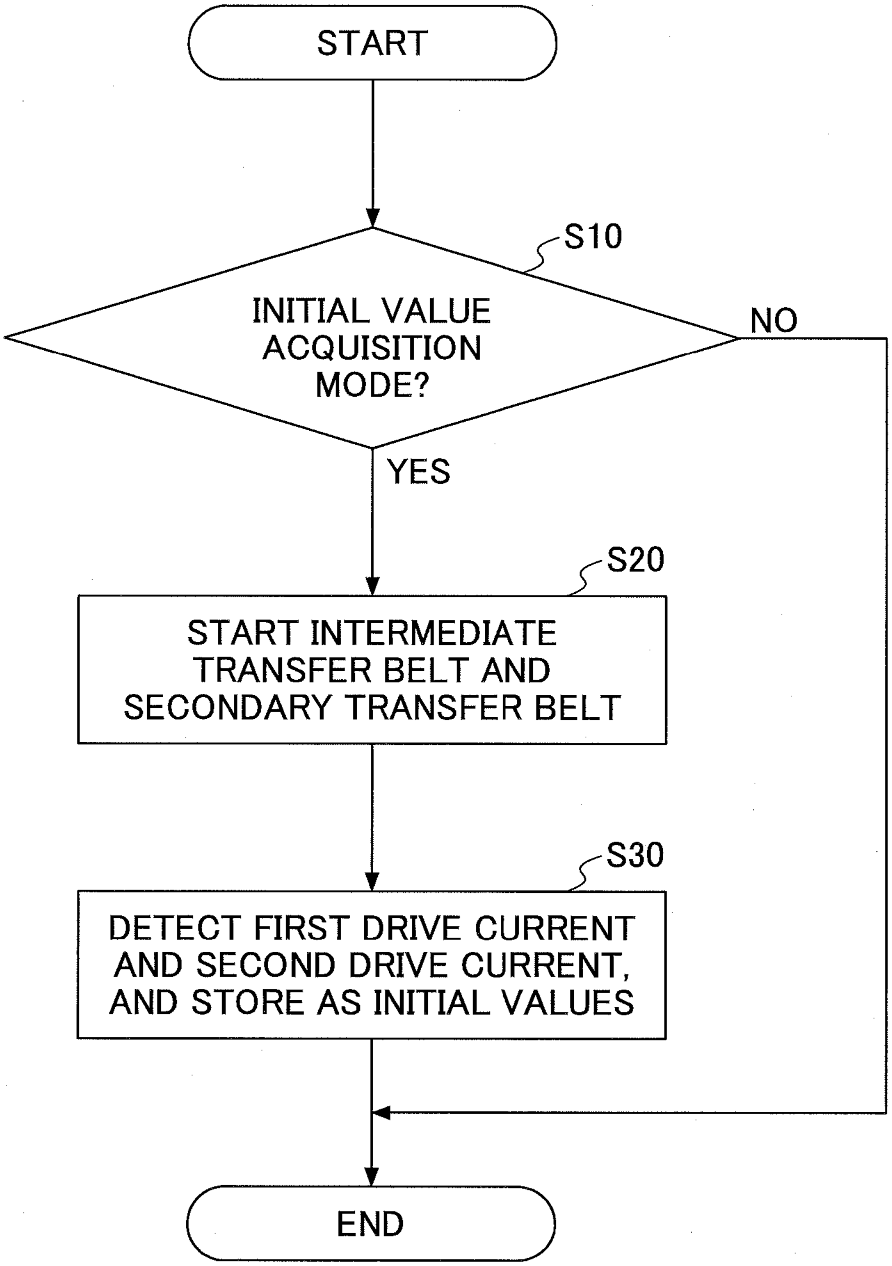
FIG. 4 is a flowchart of an initial value acquisition process according to the first embodiment.

A description is given below of a preparation process performed prior to a load abnormality detection process of the load abnormality detection apparatus according to the present embodiment. FIG. 4 is a flowchart of the preparation process. A first initial value C1 and a second initial value C2 are acquired in the preparation process illustrated in FIG. 4. The first initial value C1 is an initial value of the drive current supplied to the intermediate transfer motor 240, and the second initial value C2 is an initial value of the drive current supplied to the second transfer motor 260. That is, the first initial value C1 is a value of the drive current supplied to the intermediate transfer motor 240 when there is no abnormality generated in the load applied to the intermediate transfer motor 240. The second initial value C2 is a value of the drive current supplied to the secondary transfer motor 260 when there is no abnormality generated in the load applied to the secondary transfer motor 260. The first initial value C1 and the second initial value C2 are used in the load abnormality detection process mentioned later.

First, it is determined in step S10 whether an initial value acquisition mode is selected in the image forming apparatus 100. Selection of the initial value acquisition mode is performed by inputting an instruction by a user performing an operation 320 (refer to FIG. 3). If it is determined that the initial value acquisition mode is not selected (NO of step S10), the preparation process is ended.

On the other hand, if it is judged that the initial value acquisition mode is selected (YES of step S10), the process proceeds to step S20. In step S20, the main control part 310 (refer to FIG. 3) starts driving the intermediate transfer motor 240 and the secondary transfer motor 260. Then, in step S30, the control CPU 290 acquires the value of the first drive current and the value of second drive current, and stores them in a memory 300 as an initial value C1 and an initial value C2, respectively. The initial value C1 and the initial value C2 are set as reference values of the first drive current and the second drive current, respectively.

The first initial value C1 and the second initial value C2 may be drive current values acquired at the time of design, or may be drive current values measured in a state where no load abnormality is generated at the time of factory delivery or at a time of performing maintenance work.

Figure 5:
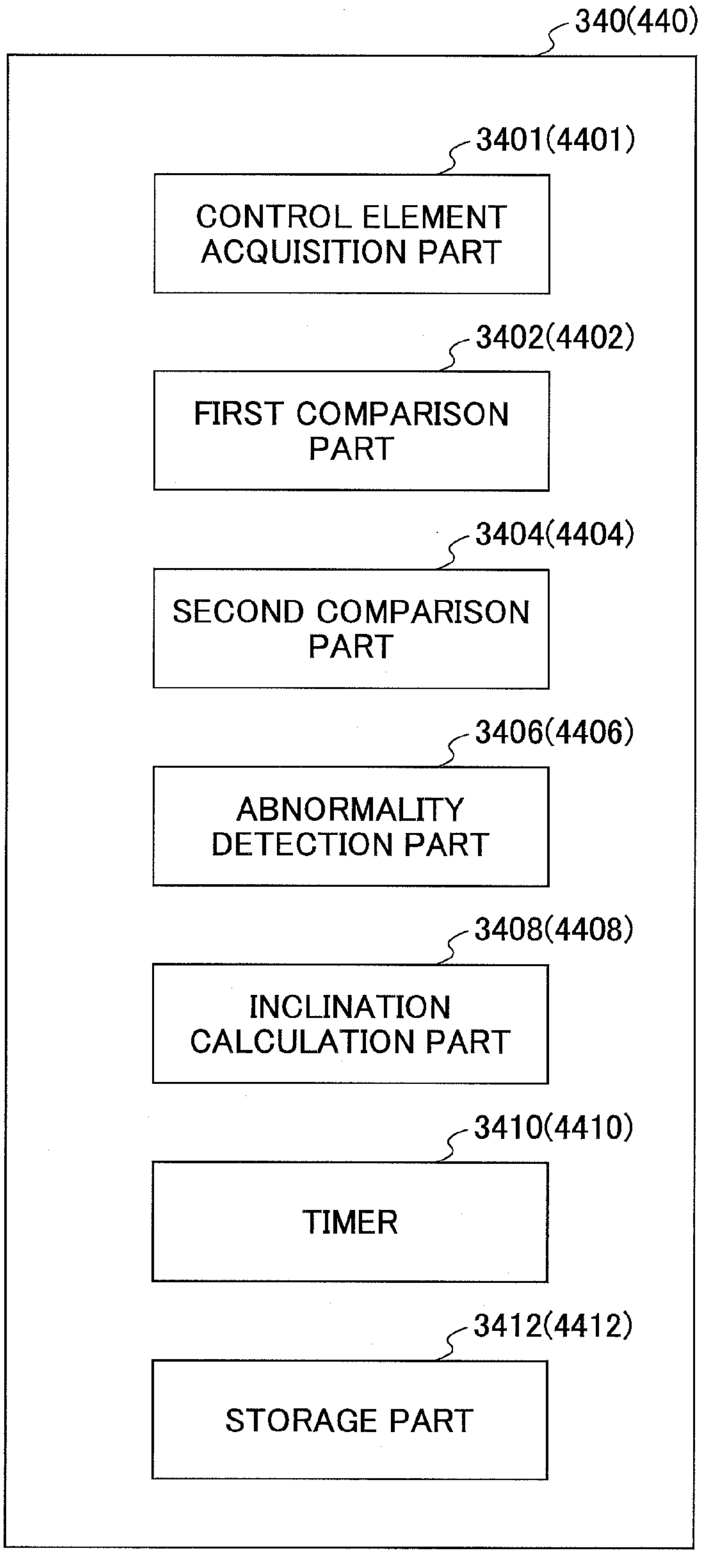
FIG. 5 is a functional block diagram of the load abnormality detection apparatus according to the first embodiment.
Figure 6:
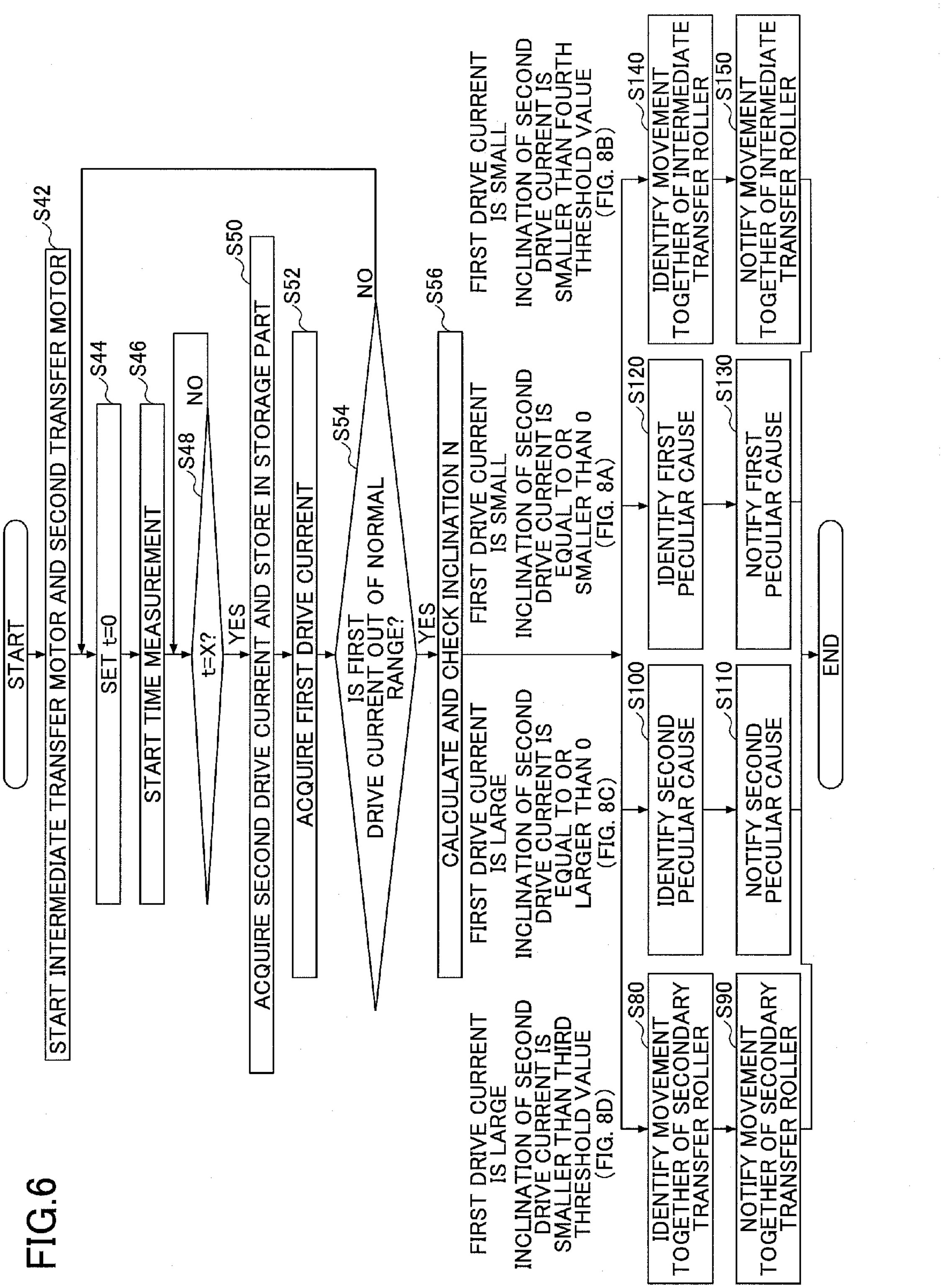
FIG. 6 is a flowchart of a load abnormality detection process according to the first embodiment.

A description will be given below of the load abnormality detection process according to the first embodiment. FIG. 5 is a functional block diagram of the load abnormality detection apparatus 340 illustrated in FIG. 4. FIG. 6 is a flowchart of the load abnormality detection process performed by the load abnormality detection apparatus 340.

As illustrated in FIG. 5, the load abnormality detection apparatus 340 includes a control element acquisition part 3401, a first comparison part 3402, a second comparison part 3404, an abnormality detection part 3406, an inclination calculation part 3408, a timer 3410 and a storage part 3412.

When the load abnormality detection process illustrated in FIG. 6 is started, first, the main control part 310 starts driving the intermediate transfer motor 240 and the secondary transfer motor 260 (step S42). Subsequently, the time of the timer 340 is set to t=0 (step S44). Then, the timer 3410 starts measuring time (step S46). Subsequently, it is determined whether the time reaches X (t=x) (step S48). When it becomes t=X, the control element acquisition part 3401 acquires a present value of the second drive current (the second control element), and stores the present value in the storage part 3412 (step S50). The time X is a value previously set, and may be a short time, for example, X=1 second.

Then, the control element acquisition part 3410 acquires a value of the first drive current (first control element) (step S52). Then, the first comparison part 3402 judges whether the first drive current falls within a normal range (step S54). Here, the normal range refers to a previously set range between a first threshold value A and a second threshold value B. That is, the first comparison part 3402 judges whether the first drive current is larger than the first threshold value (refer to FIG. 8A) or smaller than second threshold value B. In other words, the first comparison part 3402 compares the first drive current with the first threshold value A and also compares the first drive current with the second threshold value B.

Here, the first threshold value A is a value indicating a lower limit value of the first drive current, and the second threshold value B is a value indicating an upper limit value of the first drive current. That is, if the following relational expression (1) is established, the first derive current is within the normal range.

$$\text{first threshold value } A \leq \text{first drive current} \leq \text{second threshold value } B \quad (1)$$

On the other hand, if the following relational expression (2) is established, the first drive current is out of the normal range (that is, abnormal).

$$\text{first threshold value } A > \text{first drive current, or first drive current} > \text{second threshold value } B \quad (2)$$

The first threshold value A and the second threshold value B are set using the first initial value C1 explained in the description of the preparation process. For example, the first threshold value A and the second threshold value B can be set as follows:

first threshold value A=$\gamma_1$·C1 (a real number satisfying $0<\gamma_1<1$)

second threshold value B=$\gamma_2$·C1 (a real number satisfying $\gamma_2 \geq 1$)

The first threshold value A and the second threshold value B are previously stored in the memory 300 or the storage part 3412.

If the first comparison part 3402 judges that the first drive current is within the normal range (NO of step S54), the process returns to step S44. Then, the control element acquisition part 3401 acquires the value of the first drive current for each time X, and stores the value in the storage part 3412.

On the other hand, if the first comparison part 3402 judges that the first drive current is out of the normal range (YES of step S54), the process proceeds to step S56.

In step S56, the inclination calculation part 3408 computes an inclination of change in the second drive current (step S56). A description is given below of an example of a method of calculating the inclination by the inclination calculation part 3408. The method explained below may be applied to the second initial value C2 explained in the above-mentioned "preparation process."

A description is given, with reference to FIG. 7, of a method of storing the drive current values in the storage part 3412. In the example illustrated in FIG. 7, the above-mentioned time X is set to 1 second (X=1 sec.) That is, in the example of FIG. 7, the control element acquisition part 3401 acquires the value of the second drive current for every 1 second, and stores the value in the storage part 3412. In the example illustrated in FIG. 7, the values of the second drive current from the present time to a past Y point (Y is a real number; Y=100 in the example of FIG. 7) are stored. Data of values of points preceding the past Y point may be deleted by overwriting.

In the present embodiment, the inclination of change in the second drive current (control element) is a value obtained by dividing an amount of change in the second drive current by a time period of the change.

Then, the inclination calculation part 3408 calculates the inclination N of the second drive current according to a least-square method. The method of calculating an inclination used by the inclination calculation part 3408 is not limited to this method.

Then, the second comparison part 3404 checks the calculated inclination N. Specifically, the second comparison part 3404 compares the inclination N with each of a third threshold value, zero (0) and a fourth threshold value D. Here, the third threshold value C is a negative value, and the fourth threshold D value is a positive value.

The third threshold value C is a value indicating a maximum value of an inclination of decrease. The fourth threshold value D is a value indicating a maximum value of an inclination of increase. That is, if the following relational expression (3) is established, the inclination N is within a normal range:

$$\text{third threshold value } C \leq \text{inclination } N \leq \text{fourth threshold value} \quad (3)$$

The third threshold value C and the fourth threshold value D are set using the first initial value C2 explained in the description of the "preparation process." For example, the third threshold value C and the fourth threshold value D can be set as follows:

third threshold value C=$\gamma_3$·C2 (a real number satisfying $\gamma_3<0$)

fourth threshold value D=$\gamma_4$·C2 (a real number satisfying $\gamma_4 \geq 1$)

The third threshold value C and the fourth threshold value D are previously stored in the memory 300 or the storage part 3412.

Then, the abnormality detection part 3406 detects a load abnormality (an abnormality generated in the load) of the intermediate transfer belt 220 (first rotational member) and/or the secondary transfer roller 270 (second rotational member) based on a result of comparison by the first comparison part 3402 and a result of comparison by the second comparison part 3404, and also identifies a cause of the load abnormality.

Each of FIGS. 8A through 8D is a graph indicating an example of changes in the first drive current and the second drive current when a load abnormality occurs in the intermediate transfer motor 240 and/or the secondary transfer motor 260. In each of FIGS. 8A through 8D, a vertical axis represents a drive current value and a horizontal axis represent a time.

(1) Process of Identifying a Cause of Generation of Load Abnormality (Part 1):

If the first comparison part 3402 judges that the first drive current is smaller than the first threshold value A (that is, the lower limit value) and the second comparison part 3404 judges that the inclination N is equal to or smaller than zero (FIG. 8A), the process proceeds to step S120 of FIG. 6. Here, the inclination being equal to or smaller than zero means that the inclination N does not change or the inclination N is a negative value.

Figure 8A:
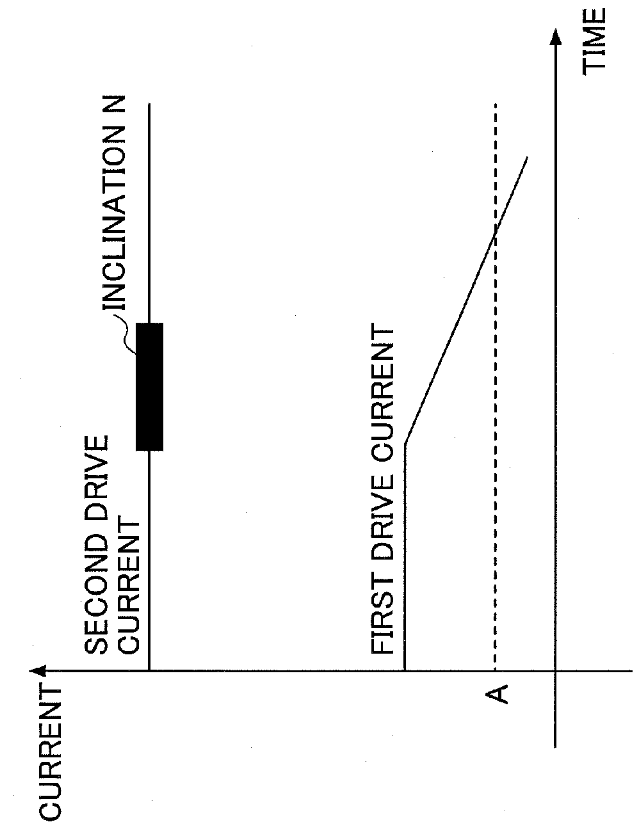
FIGS. 8A through 8D are graphs indicating changes in motor drive currents when an abnormality occurs in an intermediate transfer motor and/or a secondary transfer motor.

The state of FIG. 8A is under a condition where the load of the intermediate transfer belt 220 is extremely small due to a first peculiar cause. The first peculiar cause includes "wear of a cleaning blade contacting the intermediate transfer belt 220, slippage between the intermediate transfer belt 220 and the secondary transfer roller 270, etc".

If the load of the intermediate transfer belt 220 is extremely small, the first drive current flowing to the intermediate transfer motor 240 is extremely small, which results in the first drive current becoming smaller than the first threshold value A (lower limit value).

Moreover, there may be a case where the load of the secondary transfer roller 270 becomes small in association with an extreme reduction in the load of the intermediate transfer belt 220. In such a case, the second drive current becomes smaller. In other words, the inclination of change in the second drive current is a negative value. If the secondary transfer belt 270 does not receive an influence of the extreme reduction in the load of the intermediate transfer belt 220, the second drive current does not change. FIG. 8A illustrates a case where the inclination N of the second drive current does not change.

Then, in the state illustrated in FIG. 8A, the abnormality detection part 3406 identifies the cause of the load abnormality as the first peculiar cause to the intermediate transfer belt 220 (step S120). Then, the load abnormality detection apparatus 340 sends an abnormality notification signal, which indicates that "there is the first cause peculiar to the intermediate transfer belt 220", to the main control part 310 (step S130 of FIG. 6).

(2) Process of Identifying a Cause of Generation of Load Abnormality (Part 2):

If the first comparison part 3402 judges that the first drive current is smaller than the first threshold value A (that is, the lower limit value) and the second comparison part 3404 judges that the inclination N is larger than the fourth threshold value D (FIG. 8B), the process proceeds to step S140 of FIG. 6.

Figure 8B:
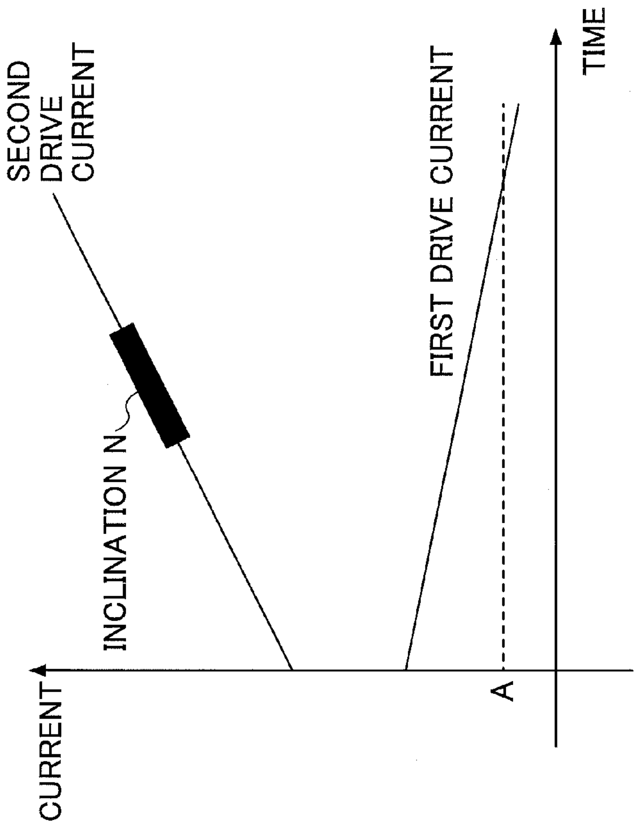

The case of FIG. 8B is under a condition where "movement together" of the intermediate transfer belt 220 by the second transfer roller 270 is generated. Here, the term "movement together" means that the intermediate transfer belt 220 is driven by a rotating force of the secondary transfer roller 270.

The phenomenon of "movement together" occurs when, for example, the roller diameter of the secondary transfer roller 270 is increased due to thermal expansion of the secondary transfer roller 270. When the secondary transfer motor 260 is controlled based on a speed detected by the encoder 330 or the like and if the roller diameter of the secondary transfer roller 270 is increased due to thermal expansion, the circumferential speed of the secondary transfer roller 270 is increased even if the secondary transfer motor 260 is rotated at a target speed. Thus, the intermediate transfer belt 220 is drawn by the secondary transfer roller 270 of which rotating speed is increased, which results in generation of "movement together" of the intermediate transfer belt 220. If such a state is set, the load of the intermediate transfer motor 240 is decreased due to the influence of "movement together" of the intermediate transfer belt 220, and, thereby, the first drive current becomes small (the first drive current becomes smaller than the first threshold value A).

On the other hand, because the force to draw the intermediate transfer belt 220 by the secondary transfer roller 270 is increased, the second drive current is increased. That the second drive current increase means that the inclination N of the second drive current becomes larger than the upper limit value (fourth threshold value D). Accordingly, the first drive current and the second drive current change as illustrated in FIG. 8B.

In the state illustrated in FIG. 8B, the abnormality detection part 3406 identifies that a cause of the load abnormality is "movement together" of the intermediate transfer belt 220 caused by the secondary transfer roller 270 (step S140).

Then, the load abnormality detection apparatus 340 sends to the main control part 310 an abnormality notification signal, which indicates that the intermediate transfer belt 220 is moved together with the secondary transfer roller 270 (step S150).

(3) Process of Identifying a Cause of Generation of Load Abnormality (Part 3):

If the first comparison part 3402 judges that the first drive current is larger than the second threshold value B (that is, the upper limit value) and the second comparison part 3404 judges that the inclination N is equal to larger than zero (FIG. 8C), the process proceeds to step S100 of FIG. 6.

Figure 8C:
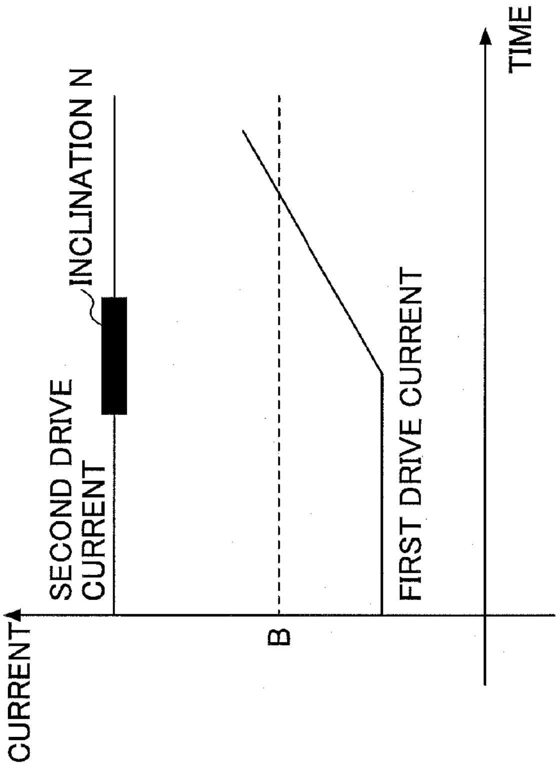

The state of FIG. 8C is the situation where a load of the intermediate transfer belt 220 becomes extremely large due to a second peculiar cause. The second peculiar cause includes, for example, that "a cleaning blade contacting the intermediate transfer belt 220 is drawn by the intermediate transfer belt 220 due to a shock applied from outside" and that "a pressure between the intermediate transfer belt 220 and the secondary transfer roller 270 is increased".

The situation of FIG. 8C is opposite to the situation of FIG. 8A mentioned above. If the load of the intermediate transfer belt 220 becomes extremely large, the first drive current flowing to the intermediate transfer motor 240 becomes extremely large (that is, the first drive current is larger than the second threshold value B (upper limit value)). Moreover, there may be a case where the load of the secondary transfer roller 270 becomes large in association with an extreme increase in the load of the intermediate transfer belt 220. In such a case, the second drive current becomes larger. That is, the inclination N becomes large. Additionally, if the secondary transfer roller 270 is not influenced by the extreme increase in the load of the intermediate transfer belt 220, the second drive current does not change. FIG. 8C illustrates a case where the second drive current does not change.

In the state of FIG. 8C, the abnormality detection part 3406 identifies a cause of the load abnormality as the second peculiar cause in the intermediate transfer belt 220 (step S100). Thus, the abnormality detection part 3406 can identify the second peculiar cause as mentioned above.

Then, the load abnormality detection apparatus 340 sends to the main control part 310 an abnormality notification signal indicating that "there is the second cause peculiar to the intermediate transfer belt 220" (step S110 of FIG. 6).

(4) Process of Identifying a Cause of Generation of Load Abnormality (Part 4):

If the first comparison part 3402 judges that the first drive current is larger than the second threshold value B (that is, the upper limit value) and the second comparison part 3404 judges that the inclination N is smaller than the fourth threshold value D (FIG. 8D), the process proceeds to step S80 of FIG. 6.

Figure 8D:
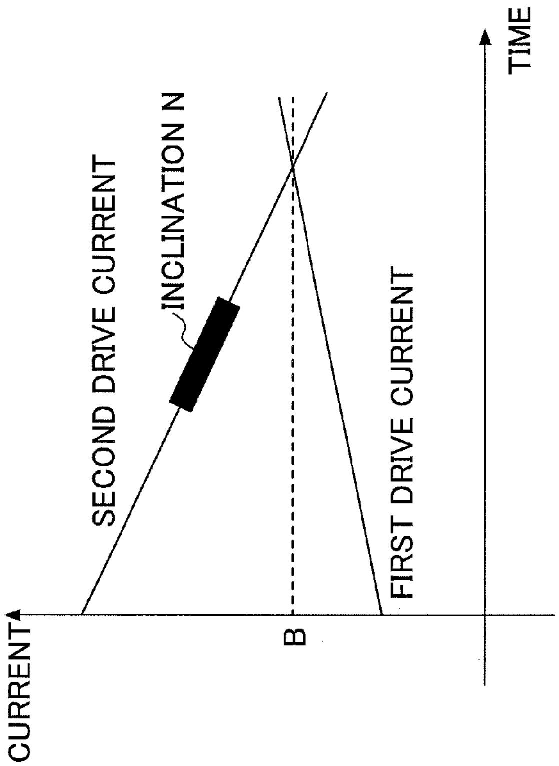

The state of FIG. 8D is under a condition where "movement together" of the intermediate transfer belt 220 caused by the second transfer roller 270 is generated. Here, the term "movement together" means that the secondary transfer roller 270 is driven by a rotationally moving force of the intermediate transfer belt 220.

The phenomenon of "movement together" occurs when, for example, the roller diameter of the secondary transfer roller 270 is decreased due to thermal contraction of the secondary transfer roller 270. When the secondary transfer motor 260 is controlled based on a speed detected by the encoder 330 or the like and if the roller diameter of the secondary transfer roller 270 is decreased due to thermal contraction, the circumferential speed of the secondary transfer roller 270 is decreased even if the secondary transfer motor 260 is rotated at a target speed. Thus, the secondary transfer roller 270 of which rotating speed is decreased is rotated by being drawn by the intermediate transfer belt 220. Under such a condition, the load of the intermediate transfer motor 240 is increased due to the influence of "movement together" of the secondary transfer belt 270, and, thereby, the first drive current becomes large (the first drive current becomes larger than the second threshold value B).

On the other hand, because the force to draw the secondary transfer roller 270 by the intermediate transfer belt 220 is decreased, the second drive current is decreased. That the second drive current is decreased means that the inclination of change in the second drive current becomes smaller than the lower limit value (the third threshold value C). Accordingly, the first drive current and the second drive current change as illustrated in FIG. 8D.

In the state illustrated in FIG. 8D, the abnormality detection part 3406 identifies that a cause of the load abnormality is "movement together" of the secondary transfer roller 270 caused by the intermediate transfer belt 220 (step S80 of FIG. 6). Then, the load abnormality detection apparatus 340 sends to the main control part 310 an abnormality notification signal indicating that the secondary transfer roller 270 is moved together with the intermediate transfer belt 220 (step S90 of FIG. 6).

As mentioned above, the notifications of the steps S90, S110, S130 and S150, which indicate identified causes, are sent from the abnormality detection part 3406 of the load abnormality detection apparatus 340 to the main control part 310. The main control part 310 may display the cause indicated by the notification on the operation part 320, or may send a notification of the cause to a maintenance service through a network line.

In the process illustrated in FIG. 6, after the first comparison part 3402 determines in step S54 that the first drive current is out of the normal range (YES of step S54), the inclination calculation part 3408 calculates the inclination N. However, the inclination calculation part 3408 may calculate the inclination N at a time when Y number of values of the second drive current is stored in the storage part 3412.

In the process illustrated in FIG. 6, the second comparison part 3404 judges whether the inclination N is smaller than the third threshold value, equal to or larger than zero, equal to or smaller than zero, and larger than the fourth threshold value. However, the absolute value of the third threshold value C may be set equal to the absolute value of the fourth threshold value D. In such a case, the absolute value of the third threshold value C (absolute value of the fourth threshold value) is referred to as a seventh threshold value, which is a positive value. Then, the second comparison part 3404 determines whether the inclination N is one of a positive value, zero and a negative value, and compares the absolute value of the inclination N with the seventh threshold value. Even if the second comparison part 3404 performs such a comparison the same effect can be obtained. It should be noted that the seventh threshold value is previously set.

As mentioned above, the load abnormality detection apparatus 340 according to the present embodiment can identify properly and surely a cause of a load abnormality of the intermediate transfer belt 220 and the secondary transfer roller 270 by measuring the first drive current and the second drive current.

First Variation of First Embodiment

Figure 9:
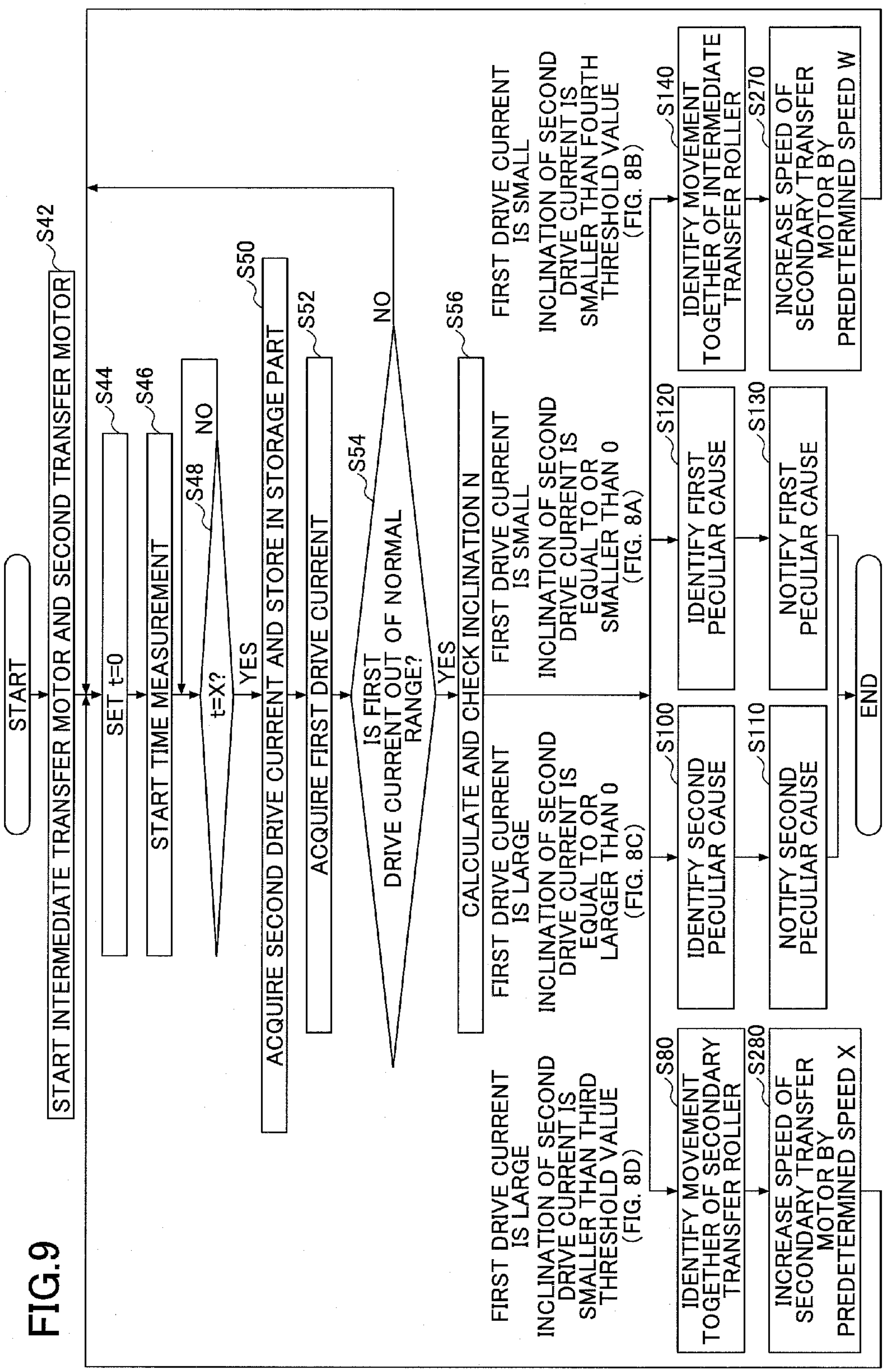
FIG. 9 is a flowchart of a load abnormality detection process according to a first variation of the first embodiment.

A description will now be given, with reference to FIG. 9, of a load abnormality detection process according to a first variation of the first embodiment. In the load abnormality detection process illustrated in FIG. 9, step S270 is substituted for step S150 of FIG. 6 and step S280 is substituted for step S90 of FIG. 6. Steps of FIG. 9 other than steps S270 and S280 are the same as the steps illustrated in FIG. 6, and descriptions thereof will be omitted. In the following description, the rotating speed of the secondary transfer roller 270 when "movement together" is not generated is referred to as a reference speed V.

A description will be given of the process of step S270. The abnormality detection part 3406 detects in step S140 that "movement together" of the intermediate transfer belt 220 caused by the secondary transfer roller 270 is generated. The fact that "movement together" is generated indicates that the rotating speed (circumferential speed) of the secondary transfer roller 270 is higher than the reference speed V. This is because the secondary transfer roller 270 is expanded due to a temperature rise and the circumferential speed is increased as mentioned above. Then, the adjustment part 3102 of the main control part 310 (refer to FIG. 3) adjusts the rotating speed of the secondary transfer roller 270 (second rotational member) to the reference speed V (step S270).

Specifically, the adjustment part 3102 adjusts the circumferential speed of the secondary transfer roller 270 by decreasing the rotating speed of the secondary transfer motor 260 by a predetermined speed W. Thereby, an appropriate load is given to the intermediate transfer belt 220. In step S270, the rotating speed of the secondary transfer motor 260 may be decreased in a stepwise fashion until a state where an abnormality is not detected is established, or the predetermined speed W is set so that a speed adjusting operation is performed only one time.

A description is given below of the process of step S280. The abnormality detection part 3406 detects in step S80 that "movement together" of the secondary transfer roller 270 caused by the intermediate transfer belt 220 is generated. The fact that "movement together" is generated indicates that the rotating speed (circumferential speed) of the secondary transfer roller 270 is lower than the reference speed V. This is because the secondary transfer roller 270 is contracted due to a temperature fall and the circumferential speed is decreased as mentioned above. Then, the adjustment part 3102 of the main control part 310 adjusts the rotating speed of the secondary transfer roller (second rotational member) to the reference speed V (step S280).

Specifically, the adjustment part 3102 adjusts the circumferential speed of the secondary transfer roller 270 by increasing the rotating speed of the secondary transfer motor 260 by a predetermined speed X. Thereby, an appropriate load is given to the intermediate transfer belt 220. In step S280, the rotating speed of the secondary transfer motor 260 may be increased in a stepwise fashion until a state where an abnormality is not detected is established, or the predetermined speed X is set so that a speed adjusting operation is performed only one time.

According to the above-mentioned first variation, even if the rotating speed of the secondary transfer roller 270 is increased or decreased excessively, the circumferential speed of the secondary transfer roller 270 can be automatically adjusted to the reference speed V.

Second Variation of First Embodiment

A description will be given, with reference to FIGS. 10A through 10D, of a load abnormality detection process according to a second variation of the first embodiment. The load abnormality detection process according to the second variation is basically the same as the load abnormality detection process according to the first variation except that a fifth threshold value A' and a sixth threshold value B' are set in the second variation. The fifth threshold value A' is slightly larger than the first threshold value A, and the sixth threshold value B' is slightly smaller than the second threshold value B.

Additionally, in the second variation, after the first comparison part 3402 determines that the first drive current is out of the normal range, the inclination calculation part 3408 calculates the inclination N (that is, the same as the flowchart illustrated in FIG. 6).

By setting the fifth threshold value A' and the sixth threshold value B', the normal range of the first drive current (mentioned in relation to the relational expression (1)) is narrowed. The narrowed normal range is referred to as a second normal range. In the second variation, if the first comparison part 3402 (refer to FIG. 5) judges that the first drive current is out of the second normal range, the abnormality detection part 3406 identifies that there is a preindication of generation of the above-mentioned four load abnormalities.

Figure 10B:
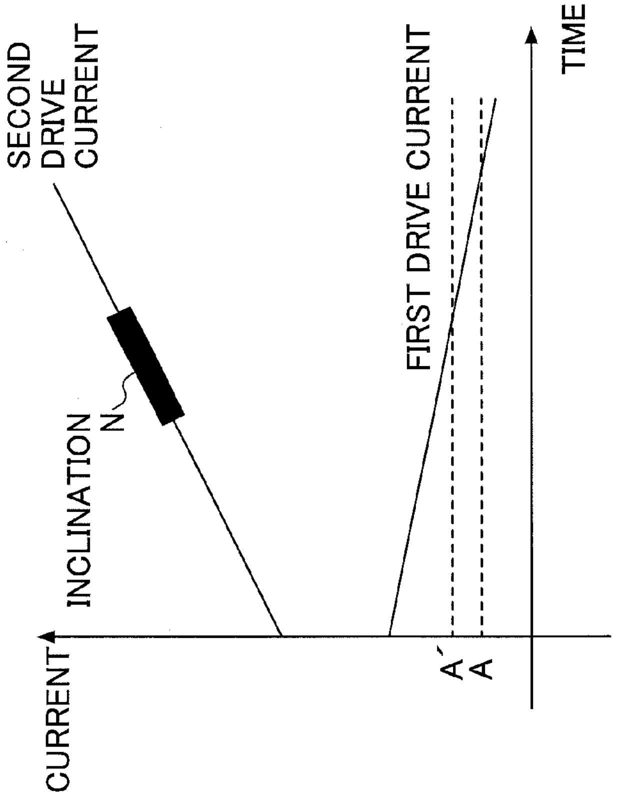
FIGS. 10A through 10D are graphs indicating changes in motor drive currents when an abnormality occurs in an intermediate transfer motor and/or a secondary transfer motor in a second variation of the first embodiment.
Figure 10A:
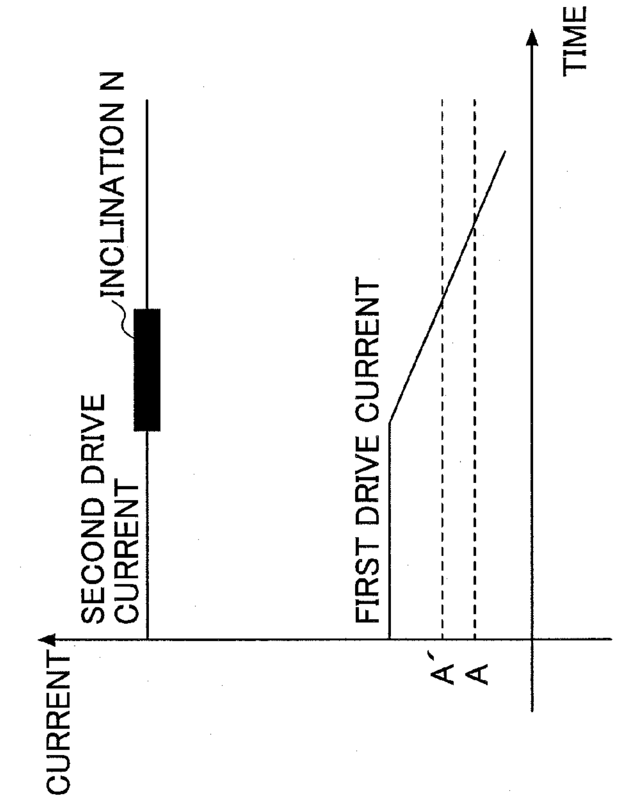

FIG. 10A illustrates a case where the first comparison part 3402 judges that the first drive current is smaller than the fifth threshold value A' and the second comparison part 3404 judges that the inclination N of the second drive current is equal to or smaller than zero. As a flow of the process, the inclination calculation part 3408 calculates the inclination N at the same time or after the first comparison part 3402 judges that the first drive current is smaller than the fifth threshold value A', and the second comparison part 3404 checks the calculated inclination N.

Then, if the second comparison part 3404 judges that the calculated inclination N is equal to or smaller than zero (FIG. 10A), the load abnormality detection apparatus 340 sends to the main control part 310 an abnormality notification signal indicating that "there is a preindication of the first peculiar cause (refer to the description of FIG. 8A) peculiar to the intermediate transfer belt 220".

FIG. 10B illustrates a case where the first comparison part 3402 judges that the first drive current is larger than fifth threshold value A' and the second comparison part 3404 judges that the inclination N is larger than the fourth threshold value D. As a flow of the process, the inclination calculation part 3408 calculates the inclination N at the same time or after the first comparison part 3402 judges that the first drive current is smaller than the fifth threshold value A', and the second comparison part 3404 checks the calculated inclination N.

If the second comparison part 3403 judges that the calculated inclination is larger than the fourth threshold value D, the load abnormality detection apparatus 340 sends to the main control part 310 an abnormality notification signal indicating that "there is a preindication of "movement together" of the intermediate transfer belt 220 caused by the secondary roller 270 (refer to the description of FIG. 8B)".

Figure 10D:
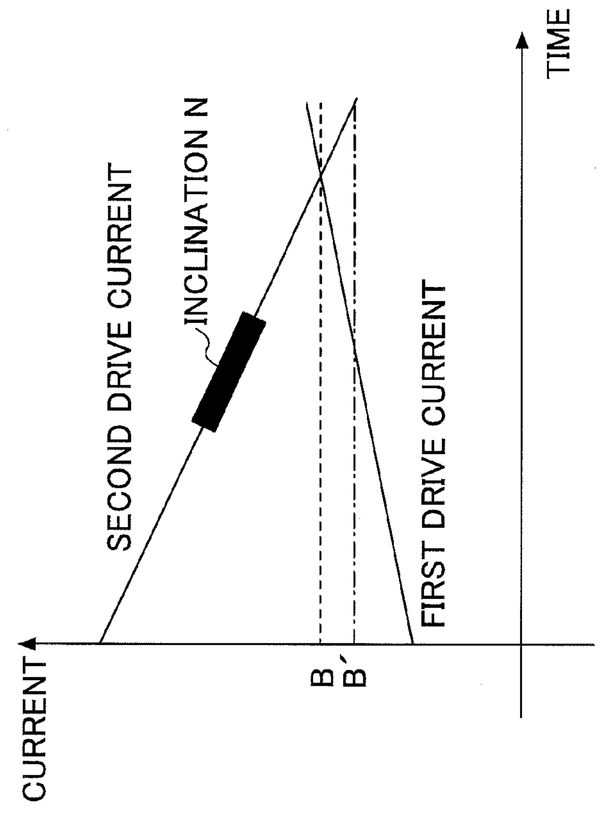
Figure 10C:
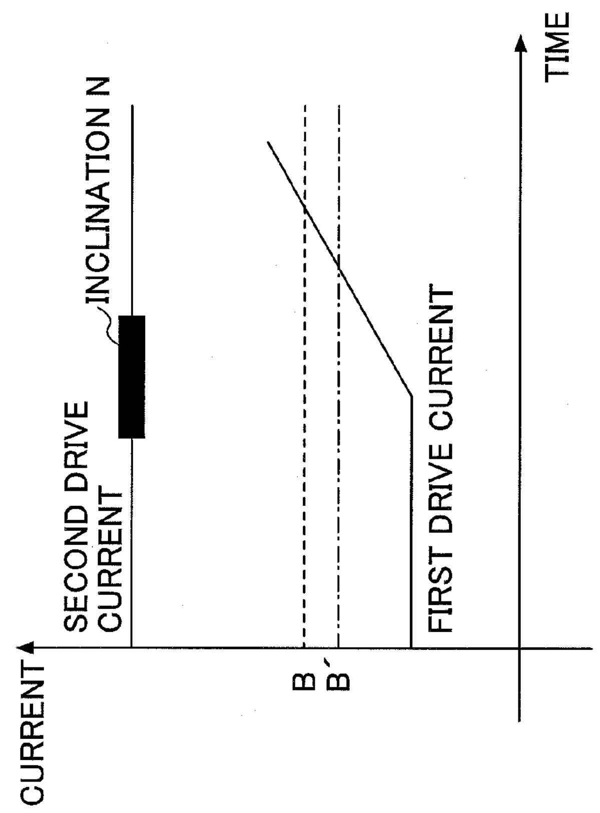

FIG. 10C illustrates a case where the first comparison part 3402 judges that the first drive current is larger than the sixth threshold value B' and the second comparison part 3404 judges that the inclination N is equal to or larger than zero. As a flow of the process, the inclination calculation part 3408 calculates the inclination N at the same time or after the first comparison part 3402 judges that the first drive current is larger than the sixth threshold value B', and the second comparison part 3404 checks the calculated inclination N.

Then, if the second comparison part 3404 judges that the inclination N of the second drive current is equal to or larger than zero (FIG. 10C), the load abnormality detection apparatus 340 sends to the main control part 310 an abnormality notification signal indicating that "there is a preindication of the second peculiar cause (refer to the description of FIG. 8C) peculiar to the intermediate transfer belt 220".

FIG. 10D illustrates a case where the first comparison part 3402 judges that the first drive current is larger than sixth threshold value B' and the second comparison part 3404 judges that the inclination N of the second drive current is smaller than the third threshold value C. As a flow of the process, the inclination calculation part 3408 calculates the inclination N at the same time or after the first comparison part 3402 judges that the first drive current is larger than the sixth threshold value B', and the second comparison part 3404 checks the calculated inclination N. Then, if the second comparison part 3404 judges that the calculated inclination is larger than the fourth threshold value D (FIG. 10D), the load abnormality detection apparatus 340 sends to the main control part 310 an abnormality notification signal indicating that "there is a preindication of "movement together" of the secondary transfer roller 270 caused by the intermediate transfer belt 220 (refer to the description of FIG. 8D)".

According to the above-mentioned second variation, a notification of a preindication of various abnormalities can be sent to the main control part 310 of the image forming apparatus 100. Thus, measures can be taken before an abnormality is generated in an output image, which reduces a downtime of an entire system.

Second Embodiment

A description will be given of a second embodiment of the present invention. In the above-mentioned first embodiment, the first drive current is used as the first control element, and the second drive current is used as the second control element. In the second embodiment described below, an average value of torque command values for driving the intermediate transfer motor 240 (hereinafter, referred to as "first torque command value") is used as the first control element, and an average value of torque command values for driving the secondary transfer motor 260 (hereinafter, referred to as "second torque command value") is used as the second control element.

Figure 11:
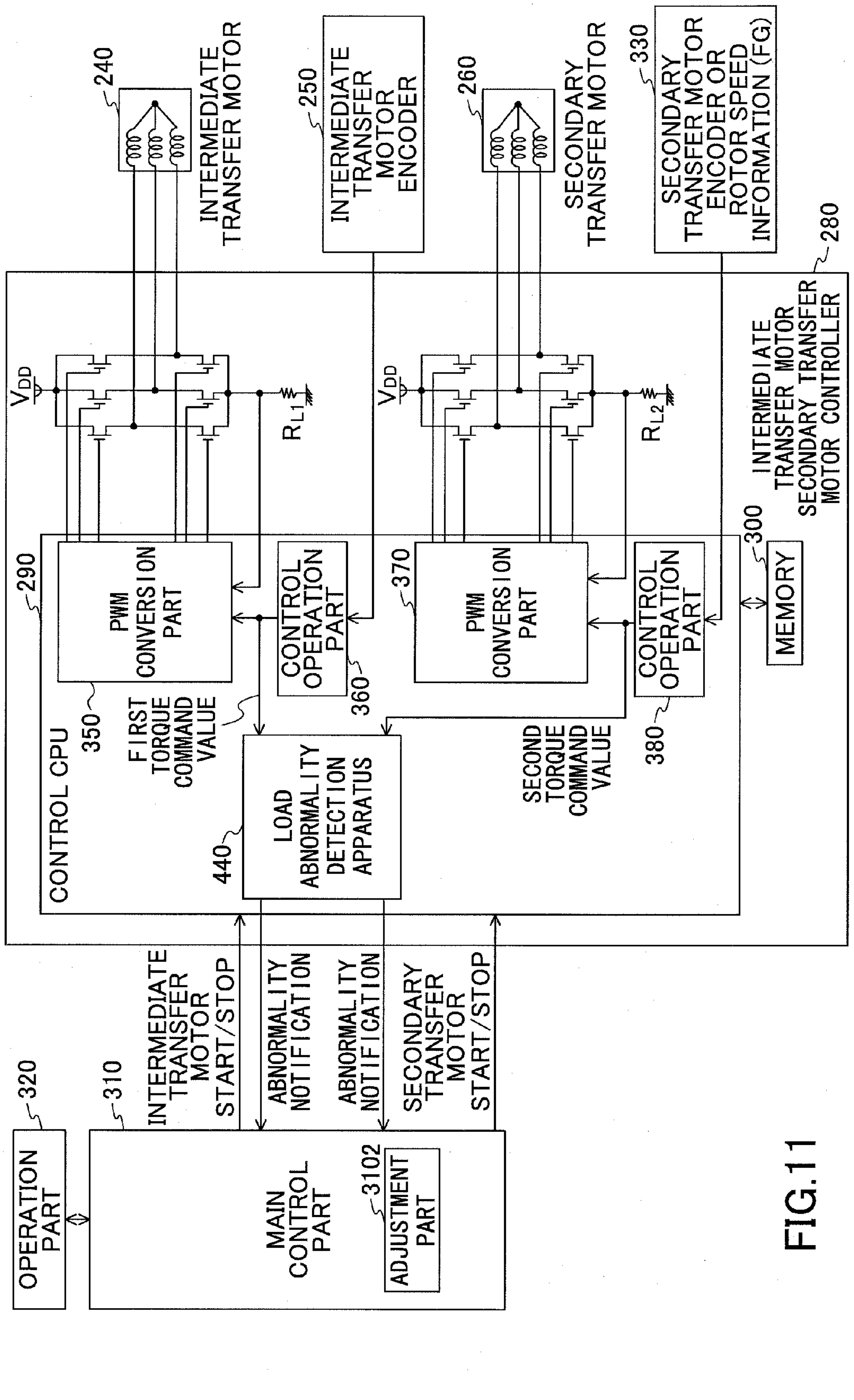
FIG. 11 is a functional block diagram of a main control part and a motor control part of a load abnormality detection apparatus according to a second embodiment of the present invention.

FIG. 11 is a functional block diagram of the main control part 310 and the motor control part 280 according to the second embodiment. In FIG. 11, parts that are the same as the parts illustrated in FIG. 3 are given the same reference numerals. The motor control part 280 according to the second embodiment has basically the same structure as the motor control part 280 according to the first embodiment illustrated in FIG. 3, but differs in that the load abnormality detection apparatus 340 is replaced by the load abnormality detection device 440 and the first and second torque command values are indicated. The first torque command value and the second torque command value are torque command values which the main control part 310 sends to the intermediate transfer motor 240 and the secondary transfer motor 260, respectively.

The control operation part 360 determines the first torque command value based on speed information supplied from the intermediate transfer motor encoder 250 of the intermediate transfer motor 240 and a target speed. The control operation part 380 determines the second torque command value based on speed information supplied from the secondary transfer motor encoder 330 of the secondary transfer motor 260 and a target speed. The thus-determined first and second torque command values are input to the load abnormality detection apparatus 440.

Figure 12:
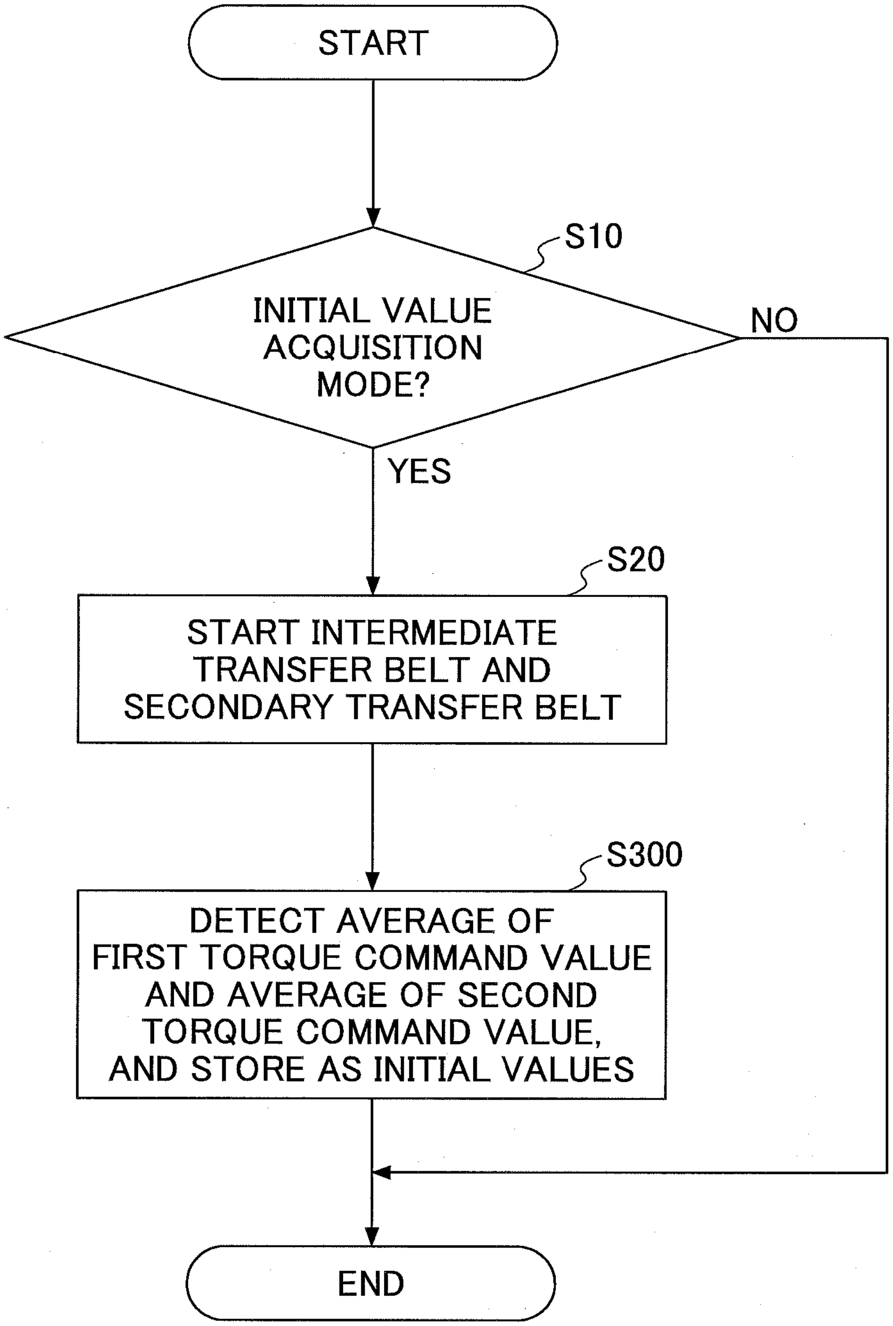
FIG. 12 is a flowchart of an initial value acquisition process according to the second embodiment.

A description is given below of a preparation process performed prior to a load abnormality detection process of the load abnormality detection apparatus according to the present embodiment. FIG. 12 is a flowchart of the preparation process according to the second embodiment.

A first initial value D1 and a second initial value D2 are acquired in the preparation process illustrated in FIG. 11. The first initial value D1 is a torque command value supplied to the first transfer motor 240, and the second initial value D2 is a torque command value supplied to the second transfer motor 260. That is, the first initial value D1 is a value of the torque command value supplied to the intermediate transfer motor 240 when there is no abnormality generated in the load applied to the intermediate transfer motor 240. The second initial value D2 is a torque command value supplied to the secondary transfer motor 260 when there is no abnormality generated in the load applied to the secondary transfer motor 260. The first initial value D1 and the second initial value D2 are used in the load abnormality detection process mentioned later.

After the process of steps S10 and S20 (refer to the description of FIG. 4), the image forming apparatus 100 acquires, in step S30, the first torque command value and the second torque command value, and stores them in the memory 300 as an initial value D1 and an initial value D2, respectively.

The first initial value D1 and the second initial value D2 may be torque command values acquired at the time of design, or may be torque command values measured in a state where no load abnormality is generated at the time of factory delivery or at a time of performing a maintenance work.

A description will be given below of the load abnormality detection process according to the second embodiment. The functional structure of the load abnormality detection apparatus 440 (refer to FIG. 13) is the same as the structure illustrated in FIG. 5, but the reference numeral of each part constituting the load abnormality detection apparatus corresponds to a parenthesized reference numeral. For example, the reference numeral indicating the control element acquisition part is "4401".

Figure 13:
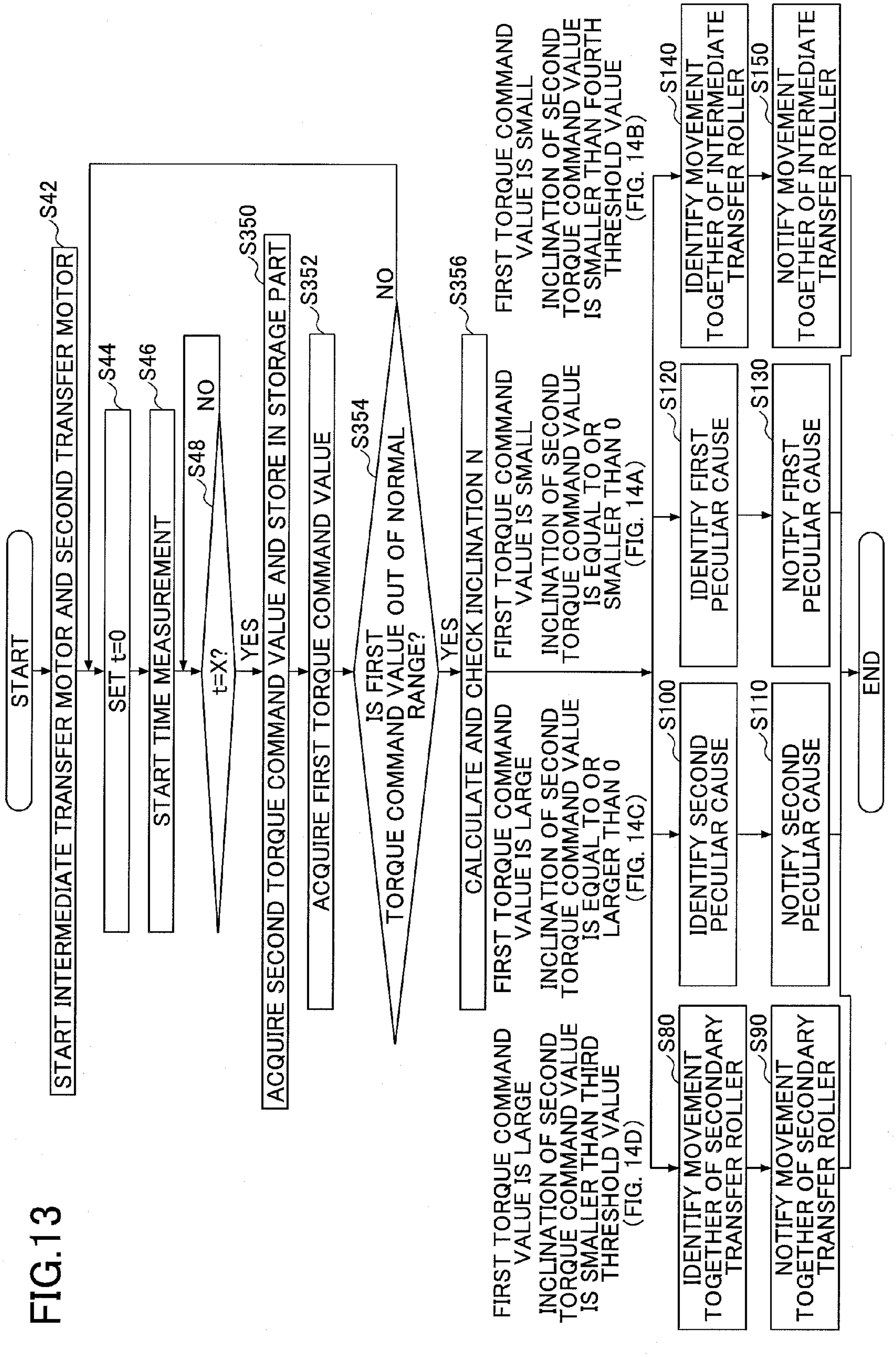
FIG. 13 is a flowchart of a load abnormality detection process according to the second embodiment.

FIG. 13 is a flowchart of the load abnormality detection process performed by the load abnormality detection apparatus 340 according to the second embodiment. FIGS. 14A through 14D illustrate changes in the first torque command value and the second torque command value when a load abnormality occurs. FIGS. 14A through 14D will be explained later.

After the process of steps S42, S44 and S46 is ended, it is determined whether the time t reaches X (t=X) (step S48). If it becomes t=X, the control element acquisition part 440 acquires the second torque command value of present time, and stored the value in the storage part 3412 (step S350).

Then, the control element acquisition part 4401 acquires a value of the first torque command value (the first control element) (step S352). Then, the first comparison part 4402 judges whether the first torque command value is out of the normal range by continuously monitoring the first torque command value (step S354). Here, the normal range means a previously determined range between a first threshold value A and a second threshold value B. That is, the first comparison part 4402 judges whether the first torque command value is larger than the previously set first threshold value A (refer to FIG. 14A) or smaller than the previously set second threshold value B. In other words, the first comparison part 4402 compares the first torque command value with the first threshold value A and also compares the first torque command value with the second threshold value B.

Here, the first threshold value A is a value which indicates a lower limit value for the first torque command value, and the second threshold value B is a value which indicates an upper limit value for the first torque command value. The first comparison part 4402 judges that the first torque command value is within the normal range if the following relational expression (4) is established:

$$\text{first threshold value } A \leq \text{first torque command value} \leq \text{second threshold value } B \tag{4}$$

On the other hand, the first comparison part 3402 judges that the first torque command value is out of the normal range (that is, the first torque command value is abnormal) if the following relational expression (5) is established:

$$\text{first threshold value } A > \text{first torque command value; or first torque command value} > \text{second threshold value B} \tag{5}$$

The first threshold value A and the second threshold value B are set using the first initial value D1 explained in the description of the preparation process. For example, the first threshold value A and the second threshold value B can be set as follows:

first threshold value A=$\gamma_1$·D1 (a real number satisfying $0<\gamma_1<1$)

second threshold value B=$\gamma_2$·D1 (a real number satisfying $\gamma_2 \geq 1$)

The first threshold value A and the second threshold value B are previously stored in the memory 300 or the storage part 4412.

If the first comparison part 4402 judges that the first torque command value is within the normal range (NO of step S354), the process returns to step S44. Then, the control element acquisition part 4401 acquires the value of the first torque command value for each time X, and stores the values in the storage part 4412.

On the other hand, if the first comparison part 4402 judges that the first torque command value is out of the normal range (YES of step S354), the process proceeds to step S356.

In step S356, the inclination calculation part 4408 calculates an inclination of change in the second torque command value. Here, the method of calculating the inclination by the inclination calculating part 4408 is the same as that explained in the above-mentioned first embodiment, and a description thereof will be omitted. Additionally, in step S356, the second comparison part 4404 checks the calculated inclination N'. Specifically, the second comparison part 4404 compares the inclination N' with a third threshold value C, compares the inclination N' with zero (0), and also compares the inclination N' with a fourth threshold value D. Here, the third threshold value C is set to a negative value and the fourth threshold value D is set to a positive value.

The third threshold value C is a value which indicates a lower limit value for the second torque command value, and the fourth threshold value D is a value which indicates an upper limit value for the second torque command value. That is, if the following relational expression (6) is satisfied, the second torque command value is within a normal range:

$$\text{third threshold value C} \leq \text{second torque command value} \leq \text{fourth threshold value D} \tag{6}$$

The third threshold value C and the fourth threshold value D are set using the second initial value D2 explained in the description of the preparation process. For example, the third threshold value C and the fourth threshold value D can be set as follows:

third threshold value C=$\gamma_3$·D2 (a real number satisfying $\gamma_3 \geq 1$)

fourth threshold value D=$\gamma_4$·D2 (a real number satisfying $\gamma_4<0$)

The third threshold value C and the fourth threshold value D are previously stored in the memory 300.

Then, the abnormality detection part 4406 detects a load abnormality of the intermediate transfer belt 220 (first rotational member) and/or the secondary transfer roller 270 (second rotational member) based on a result of comparison by the first comparison part 4402 and a result of comparison by the second comparison part 4404, and also identifies a cause of the load abnormality.

Each of FIGS. 14A through 14D is a graph indicating an example of changes in the first torque command value and the second torque command value when a load abnormality occurs in the intermediate transfer motor 240 and/or the secondary transfer motor 260.

(1) Process of Identifying a Cause of Generation of Load Abnormality (Part 1):

If the first comparison part 4402 judges that the first torque command value is smaller than the first threshold value A (that is, the lower limit value) and the second comparison part 4404 judges that the inclination N' is equal to or smaller than zero (FIG. 14A), the process of FIG. 13 proceeds to step S120. Here, that the inclination is equal to or smaller than zero means that the inclination N' does not change or the inclination is a negative value.

The state of FIG. 14A and the first peculiar cause are the same as that explained with reference to FIG. 8A, and a description thereof will be omitted.

Figure 14B:
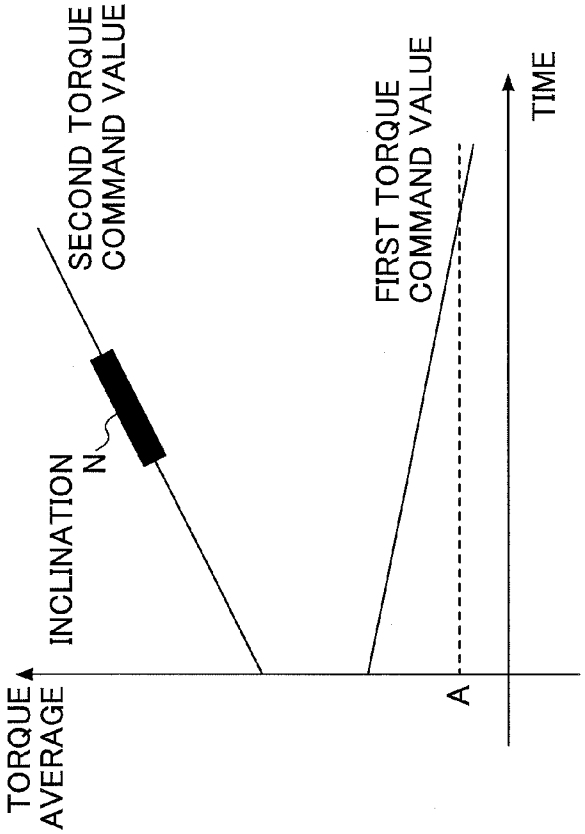
FIGS. 14A through 14D are graphs indicating changes in torque command values when an abnormality occurs in an intermediate transfer motor and/or a secondary transfer motor.
Figure 14A:
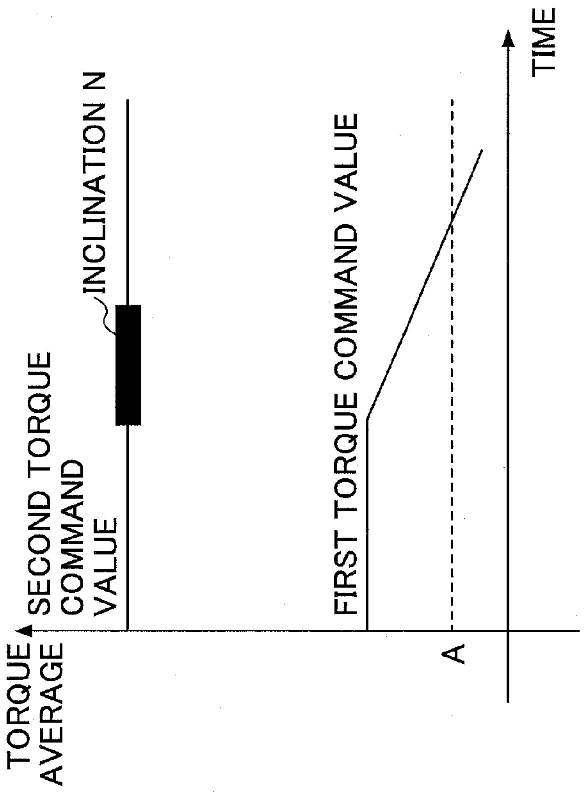

In the state of FIG. 14A, the abnormality detection part 4406 identifies that the cause of the load abnormality is a cause peculiar to the intermediate transfer belt 220 (first peculiar cause) (step S120). Then, the load abnormality detection apparatus 440 sends an abnormality notification signal, which indicates that "there is the first cause peculiar to the intermediate transfer belt 220", to the main control part 310 (step S130).

(2) Process of Identifying a Cause of Generation of Load Abnormality (Part 2):

If the first comparison part 3402 judges that the first torque command value is smaller than the first threshold value A (that is, the lower limit value) and the second comparison part 3404 judges that the inclination N' is larger than the fourth threshold value D (FIG. 14B), the process proceeds to step S140.

The state of FIG. 14B and the "movement together" have been explained with reference to FIG. 8B, and a description thereof will be omitted.

Then, the load abnormality detection apparatus 440 sends to the main control part 310 an abnormality notification signal, which indicates that the intermediate transfer belt 220 is moved together with the secondary transfer roller 270 (step S150 of FIG. 13).

(3) Process of Identifying a Cause of Generation of Load Abnormality (Part 3):

If the first comparison part 4402 judges that the first torque command value is larger than the second threshold value B (that is, the upper limit value) and the second comparison part 4404 judges that the inclination N' is equal to or larger than zero (FIG. 14C), the process of FIG. 13 proceeds to step S100. That the inclination is equal to or larger than zero means that the inclination N' does not change or the inclination is a positive value.

Figure 14C:
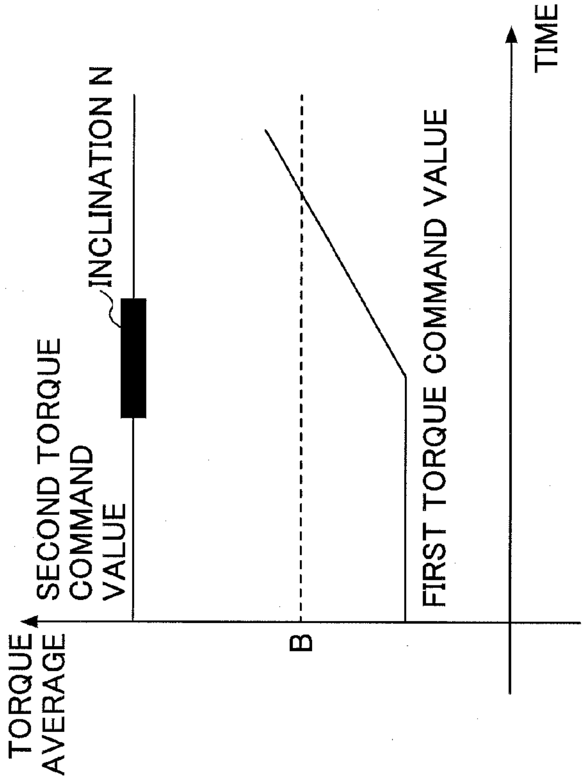

The state of FIG. 14C and the second peculiar cause are the same as that explained with reference to FIG. 8C, and a description thereof will be omitted.

(4) Process of Identifying a Cause of Generation of Load Abnormality (Part 4):

If the first comparison part 4402 judges that the first torque command value is larger than the second threshold value B (that is, the upper limit value) and the second comparison part 4404 judges that the inclination N' is smaller than the fourth threshold value D (FIG. 14D), the process proceeds to step S80.

The state of FIG. 14B and the "movement together" have been explained with reference to FIG. 8D, and a description thereof will be omitted.

Figure 14D:
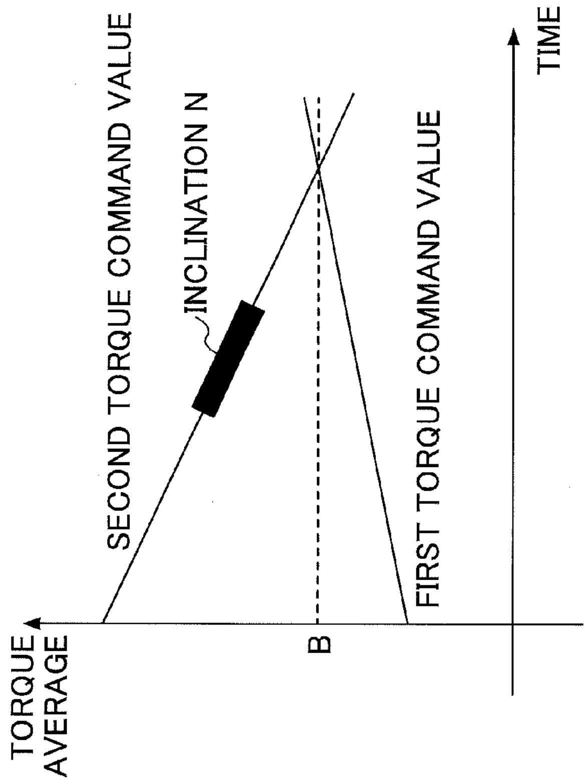

In the state of FIG. 14D, the load abnormality detection part 4406 identifies that the cause of the load abnormality is the movement together of the secondary transfer roller 270 by the intermediate transfer belt 220 (step S80).

Then, the load abnormality detection apparatus 440 sends to the main control part 310 an abnormality notification signal, which indicates that the secondary transfer roller 270 is moved together with the intermediate transfer belt 220 (step S90).

As mentioned above, the notifications of the steps S90, S110, S130 and S150, which indicate identified causes, are sent from the abnormality detection part 4406 of the load abnormality detection apparatus 440 to the main control part 310. The main control part 310 may display the cause indicated by the notification on the operation part 320, or may send a notification of the cause to a maintenance service through a network line.

As mentioned above, the load abnormality detection apparatus 440 according to the present embodiment can identify properly and surely a cause of a load abnormality of the intermediate transfer belt 220 and the secondary transfer roller 270 based on the measurement of the first torque command value and the second torque command value.

First Variation of Second Embodiment

Figure 15:
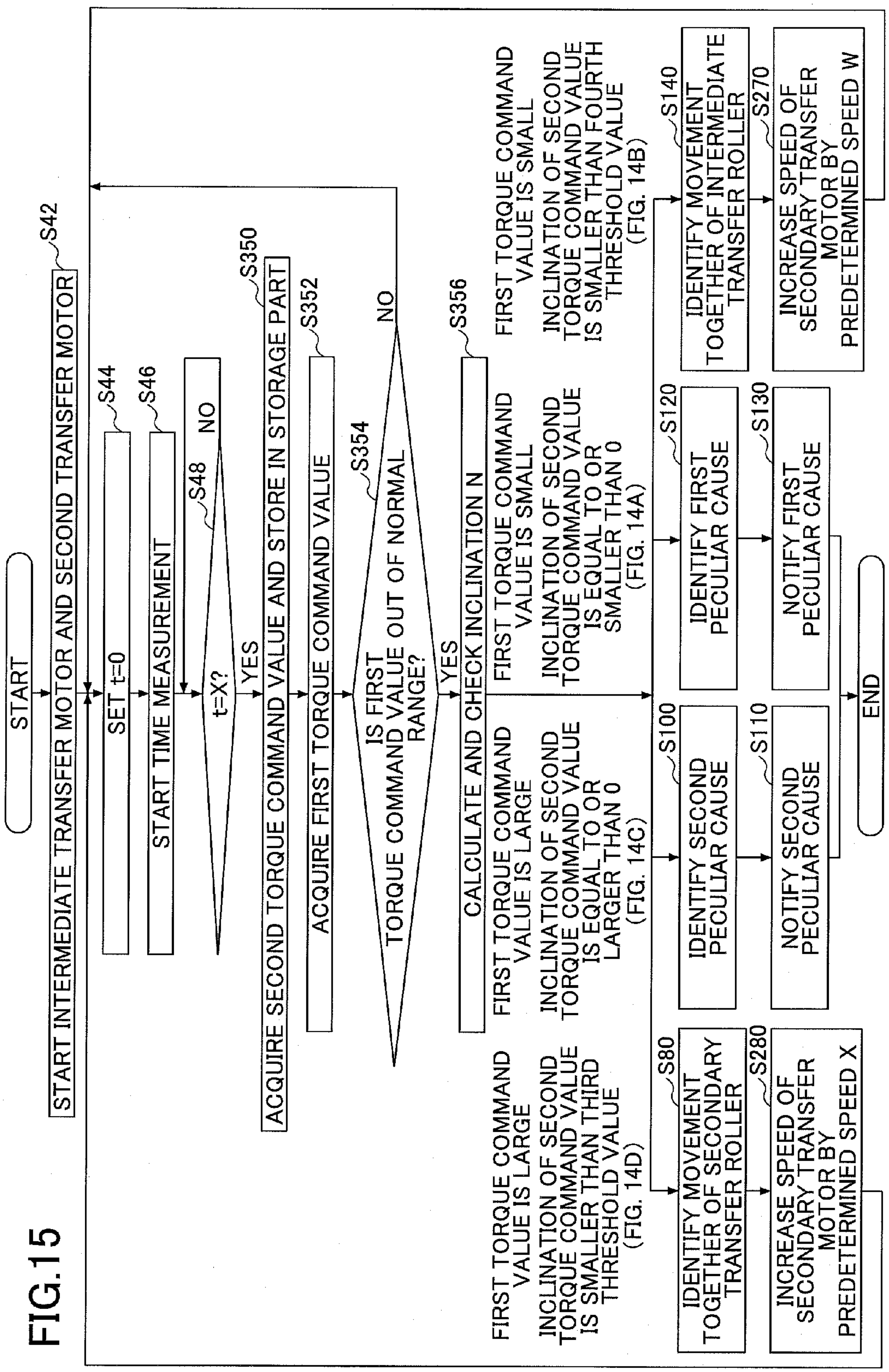
FIG. 15 is a flowchart of a load abnormality detection process according to a first variation of the second embodiment.

A description will now be given, with reference to FIG. 15, of a load abnormality detection process according to a first variation of the second embodiment. In the load abnormality detection process illustrated in FIG. 15, step S270 is substituted for step S150 of FIG. 13 and step S280 is substituted for step S90 of FIG. 13. Steps of FIG. 15 other than steps S270 and S280 are the same as the steps illustrated in FIG. 13, and descriptions thereof will be omitted. In the following description, the rotating speed of the secondary transfer roller 270 when "movement together" is not generated is referred to as a reference speed V.

A description will be given of the process of step S270. The abnormality detection part 4406 detects in step S140 that "movement together" of the intermediate transfer belt 220 caused by the secondary transfer roller 270 is generated. The fact that "movement together" is generated indicates that the rotating speed (circumferential speed) of the secondary transfer roller 270 is higher than the reference speed V. This is because the secondary transfer roller 270 is expanded due to a temperature rise and the circumferential speed is increased as mentioned above. Then, the adjustment part 3102 of the main control part 310 (refer to FIG. 11) adjusts the rotating speed of the secondary transfer roller (second rotational member) to the reference speed V (step S270).

Specifically, the adjustment part 3102 adjusts the circumferential speed of the secondary transfer roller 270 by decreasing the rotating speed of the secondary transfer motor 260 by a predetermined speed W. Thereby, an appropriate load is given to the intermediate transfer belt 220. In step S270, the rotating speed of the secondary transfer motor 260 may be decreased in a stepwise fashion until a state where an abnormality is not detected is established, or the predetermined speed W is set so that a speed adjusting operation is performed only one time.

A description is given below of the process of step S280. The abnormality detection part 4406 detects in step S80 that "movement together" of the secondary transfer roller 270 caused by the intermediate transfer belt 220 is generated. The fact that "movement together" is generated indicates that the rotating speed (circumferential speed) of the secondary transfer roller 270 is lower than the reference speed V. This is because the secondary transfer roller 270 is contracted due to a temperature fall and the circumferential speed is decreased as mentioned above. Then, the adjustment part 3102 of the main control part 310 adjusts the rotating speed of the secondary transfer roller (second rotational member) to the reference speed V (step S280).

Specifically, the adjustment part 3102 adjusts the circumferential speed of the secondary transfer roller 270 by increasing the rotating speed of the secondary transfer motor 260 by a predetermined speed X. Thereby, an appropriate load is given to the intermediate transfer belt 220. In step S280, the rotating speed of the secondary transfer motor 260 may be increased in a stepwise fashion until a state where an abnormality is not detected is established, or the predetermined speed X is set so that a speed adjusting operation is performed only one time.

According to the above-mentioned first variation, even if the rotating speed of the secondary transfer roller 270 is increased or decreased excessively, the circumferential speed of the secondary transfer roller 270 can be automatically adjusted to the reference speed V.

Second Variation of Second Embodiment

A description will be given, with reference to FIG. 16A through 16D, of a load abnormality detection process according to a second variation of the second embodiment. The load abnormality detection process according to the second variation is basically the same as the load abnormality detection process according to the first variation except that a fifth threshold value A' and a sixth threshold value B' are set in the second variation. The fifth threshold value A' is slightly larger than the first threshold value A, and the sixth threshold value B' is slightly smaller than the second threshold value.

By setting the fifth threshold value A' and the sixth threshold value B', the normal range of the first torque command value (mentioned in relation to the relational expression (4)) is narrowed. The narrowed normal range is referred to as a second normal range. In the second variation, if the first comparison part 4402 (refer to FIG. 5) judges that the first torque command value is out of the second range, the abnormality detection part 3406 identifies that there is a preindication of generation of the above-mentioned four load abnormalities.

Figure 16B:
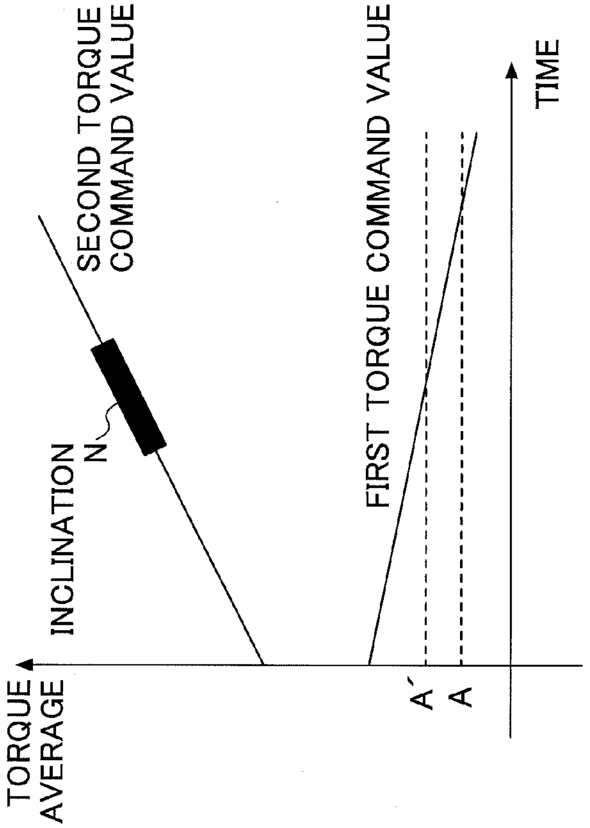
FIGS. 16A through 16D are graphs indicating changes in torque command values when an abnormality occurs in an intermediate transfer motor and/or a secondary transfer motor in a second variation of the second embodiment.
Figure 16A:
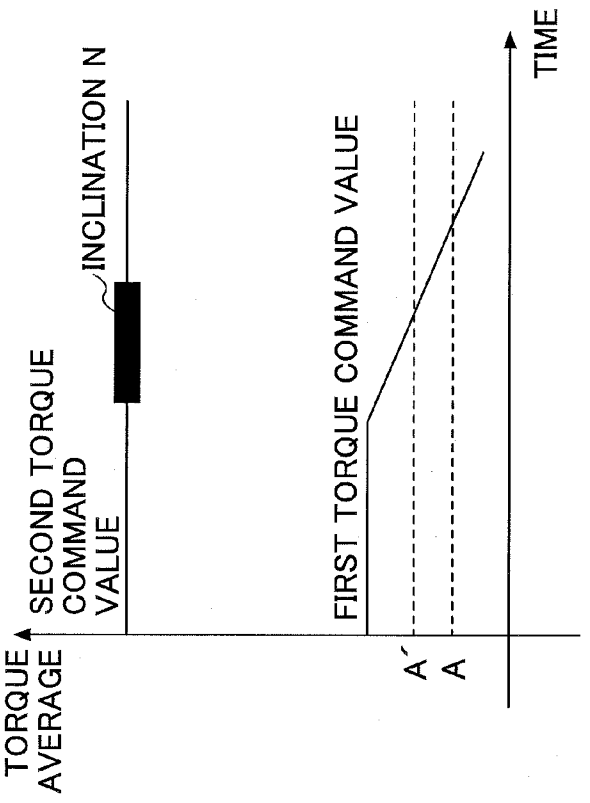

FIG. 16A illustrates a case where the first comparison part 3402 judges that the first torque command value is smaller than the fifth threshold value A' and the second comparison part 4404 judges that the inclination N' of the second torque command value is equal to or smaller than zero. As a flow of the process, the inclination calculation part 4408 calculates the inclination N' at the time or after the first comparison part 4402 judges that the first torque command value is smaller than the fifth threshold value A', and the second comparison part 4404 checks the calculated inclination N'.

Then, the load abnormality detection apparatus 440 sends to the main control part 310 an abnormality notification signal indicating that "there is a preindication of the first peculiar cause (refer to the description of FIG. 8A) peculiar to the intermediate transfer belt 220".

FIG. 16B illustrates a case where the first comparison part 4402 judges that the first torque command value is smaller than fifth threshold value A' and the second comparison part 4404 judges that the inclination N' of the second torque command value is larger than the fourth threshold value A. As a flow of the process, the inclination calculation part 4408 calculates the inclination N' at the time or after the first comparison part 4402 judges that the first torque command value is smaller than the fifth threshold value A', and the second comparison part 4404 checks the calculated inclination N'.

Then, the load abnormality detection apparatus 440 sends to the main control part 310 an abnormality notification signal indicating that "there is a preindication of "movement together" of the intermediate transfer belt 220 caused by the secondary transfer roller 270 (refer to the description of FIG. 8B)".

Figure 16C:
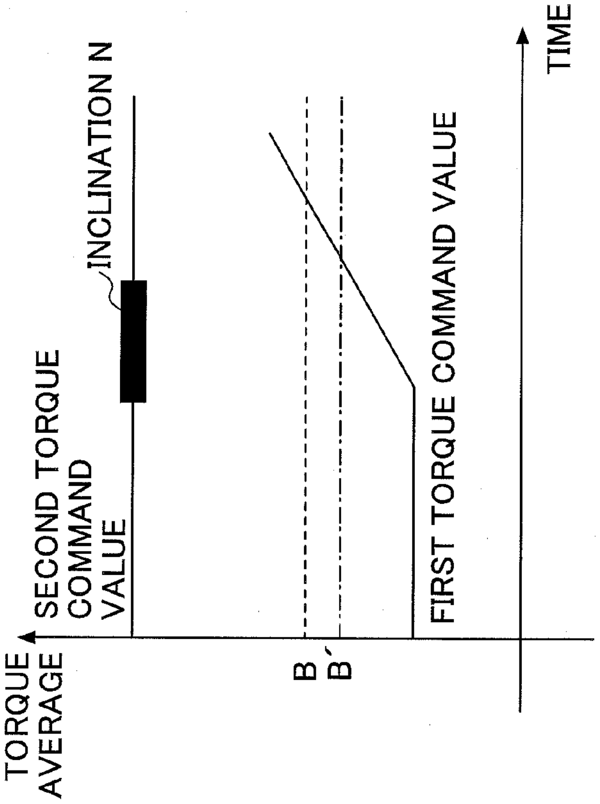

FIG. 16C illustrates a case where the first comparison part 4402 judges that the first drive current is larger than the sixth threshold value B' and the second comparison part 3404 judges that the inclination N' of the second drive current is equal to or smaller than zero. As a flow of the process, the inclination calculation part 4408 calculates the inclination N' at the time or after the first comparison part 4402 judges that the first torque command value is larger than the sixth threshold value B', and the second comparison part 4404 checks the calculated inclination N'.

Then, the load abnormality detection apparatus 440 sends to the main control part 310 an abnormality notification signal indicating that "there is a preindication of the second peculiar cause (refer to the description of FIG. 8C) peculiar to the intermediate transfer belt 220".

Figure 16D:
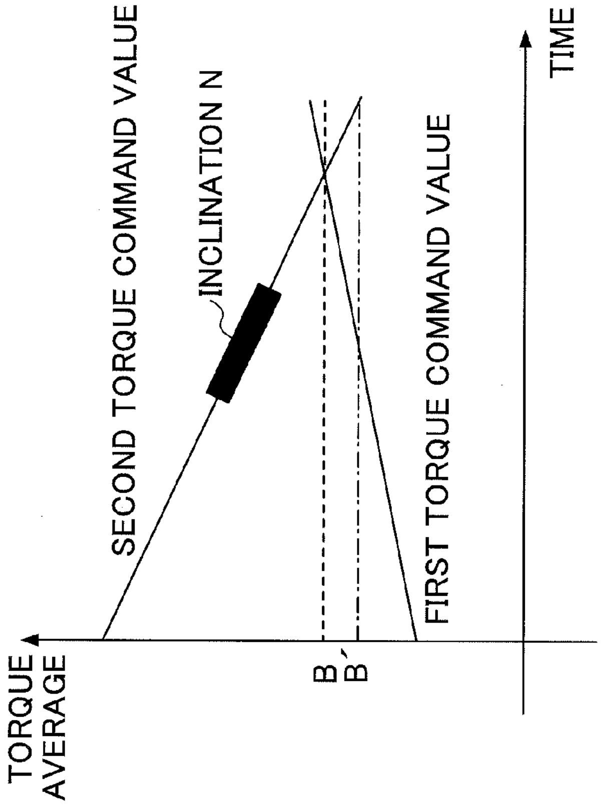

FIG. 16D illustrates a case where the first comparison part 4402 judges that the first torque command value is larger than sixth threshold value B' and the second comparison part 3404 judges that the inclination N' of the second torque command value is smaller than the third threshold value C. As a flow of the process, the inclination calculation part 4408 calculates the inclination N' at the time or after the first comparison part 4402 judges that the first torque command value is larger than the sixth threshold value B', and the second comparison part 4404 checks the calculated inclination N'.

Then, the load abnormality detection apparatus 440 sends to the main control part 310 an abnormality notification signal indicating that "there is a preindication of "movement together" of the secondary transfer roller 270 caused by the intermediate transfer belt 220 (refer to the description of FIG. 8D)".

According to the above-mentioned second variation, a notification of a preindication of various abnormalities can be sent to the main control part 310 of the image forming apparatus 100. Thus, measures can be taken before an abnormality is generated in an output image, which reduces a downtime of an entire system.

(Load Abnormality Detection Program)

Figure 17:
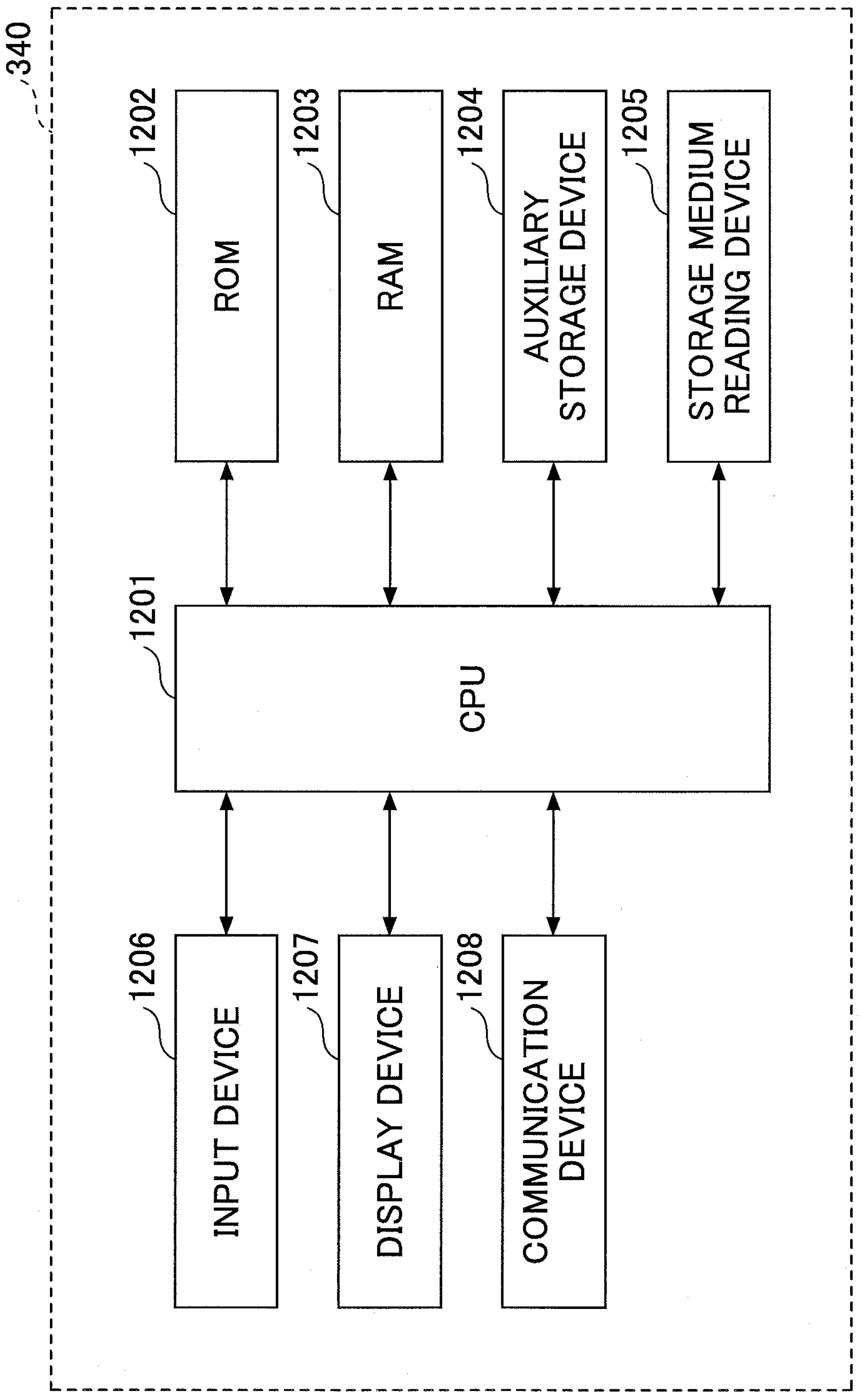
FIG. 17 is a block diagram of a hardware structure of a load abnormality detection apparatus according to an embodiment of the present invention.

FIG. 17 is a block diagram of a hardware structure of a load abnormality detection apparatus according to an embodiment of the present invention. The load abnormality detection apparatus includes a CPU 1201, a ROM (Read Only Memory) 1202, a RAM (Random Access Memory) 1203, an auxiliary storage device 1204, a recording medium reading device 1205, an input device 1206, a display device 1207 and a communication device 1208.

The CPU 1201 includes a microprocessor and peripheral circuits thereof to control the entire load abnormality detection apparatus. The ROM 1202 is a memory to store predetermined control programs (software parts) executed by the CPU 1202.

The RAM 1203 is used as a work area when the CPU 1201 executes the programs stored in the ROM 1202 to perform various controls.

The auxiliary storage device 1204 is a device to store various sets of information including information regarding a project such as task information. For example, an HDD (hard Disk Drive), which is a non-volatile memory, is used as the auxiliary storage device 1204. It should be noted that the above-mentioned various sets of information may be stored in a recording medium such as a CD-ROM (Compact Disk-Read Only Memory), a DVD (Digital Versatile Disk), or other computer readable recording media other than the auxiliary storage device 1204. Various sets of information stored in the recording media are read by a drive device such as the recording medium reading device 1205. Accordingly, various sets of information can be acquired by setting a recording medium in the recording medium reading device 1205. The input device 1206 is a device operated by a user to input instructions and information. The input device 1206 includes a mouse, a keyboard, a touch panel key displayed on a display screen of the display device 1207, etc.

In the load abnormality detection apparatus having the above-mentioned structure, a load abnormality program is executed by the CPU 1202 to perform the above-mentioned load abnormality detection process. The load abnormality detection program is previously stored in the ROM 1202. Alternatively, the load abnormality detection program is stored in a computer-readable recording medium. The load abnormality detection program stored in the computer-readable recording medium is read by the recording medium reading device 1205, and is stored in the RAM 1203 and executed by the CPU 1201.

The present invention is not limited to the specifically disclosed embodiments, and variations and modifications may be made without departing from the scope of the present invention.

The present application is based on Japanese priority applications No. 2010-208585 filed on Sep. 16, 2010 and No. 2011-191401 filed on Sep. 2, 2011, the entire contents of which are incorporated herein by reference.

What is claimed is:

1. A load abnormality detection apparatus that detects a load abnormality in at least one of a first rotational member and a second rotational member provided in an apparatus including: the first rotational member and the second rotational member that act on each other; a first motor that drives said first rotational member and is controlled based on a first control element; and a second motor that drives said second rotational member and is controlled based on a second control element, said load abnormality detection apparatus comprising: an element acquisition part configured to acquire said first control element and said second control element; an inclination calculation part configured to calculate an inclination of change in said second control element; a first comparison part configured to compare said first control element with a first threshold value and also compare said first control element with a second threshold value larger than said first threshold value; a second comparison part configured to compare an inclination of change in said second control element with a third threshold value, which is a negative value, and also compare the inclination of change in said second control element with a fourth threshold value, which is a positive value; and an abnormality detection part configured to detect a load abnormality in a load applied to at least one of said first rotational member and said second rotational member based on results of comparison by said first comparison part and said second comparison part and identify a cause of the detected load abnormality.

2. The load abnormality detection apparatus as claimed in claim 1, wherein, when said first control element is smaller than said first threshold value and the inclination of change in said second control element is equal to or smaller than zero, said abnormality detection part identifies that a cause of said load abnormality is a first peculiar cause of said first rotational member.

3. The load abnormality detection apparatus as claimed in claim 2, wherein, when said first control element is larger than a fifth threshold value, which is larger than said first threshold value, and the inclination of change in said second control element is equal to or smaller than zero, said abnormality detection part detects that there is a preindication of the first peculiar cause of said first rotational member.

4. The load abnormality detection apparatus as claimed in claim 1, wherein, when said first control element is smaller than said first threshold value and the inclination of change in said second control element is larger than a fourth threshold value, said abnormality detection part identifies that a cause of said load abnormality is a movement together of said first rotational member caused by said second rotational member.

5. The load abnormality detection apparatus as claimed in claim 4, wherein, when said first control element is larger than said fifth threshold value and the inclination of change in said second control element is larger than said fourth threshold value, said abnormality detection part detects that there is a preindication of the movement together of said first rotational member caused by said second rotational member.

6. The load abnormality detection apparatus as claimed in claim 1, wherein, when said first control element is larger than said second threshold value and the inclination of change in said second control element is equal to or larger than zero, said abnormality detection part identifies that a cause of said load abnormality is a second peculiar cause of said first rotational member.

7. The load abnormality detection apparatus as claimed in claim 6, wherein, when said first control element is larger than a sixth threshold value, which is smaller than said second threshold value, and the inclination of change in said second control element is equal to or larger than zero, said abnormality detection part detects that there is a preindication of the second peculiar cause of said first rotational member.

8. The load abnormality detection apparatus as claimed in claim 1, wherein, when said first control element is larger than said second threshold value and the inclination of change in said second control element is smaller than a third threshold value, said abnormality detection part identifies that a cause of said load abnormality is a movement together of said second rotational member caused by said first rotational member.

9. The load abnormality detection apparatus as claimed in claim 8, wherein, when said first control element is larger than said sixth threshold value and the inclination of change in said second control element is smaller than said third threshold value, said abnormality detection part detects that there is a preindication of the movement together of said second rotational member caused by said first rotational member.

10. The load abnormality detection apparatus as claimed in claim 4, further comprising an adjustment part configured to adjust a speed of said second rotational member to a reference speed when said abnormality detection part identifies said movement together, the reference speed being a speed of said second rotational member when said movement together is not generated.

11. The load abnormality detection apparatus as claimed in claim 8, further comprising an adjustment part configured to adjust a speed of said second rotational member to a reference speed when said abnormality detection part identifies said movement together, the reference speed being a speed of said second rotational member when said movement together is not generated.

12. The load abnormality detection apparatus as claimed in claim 1, wherein said first control element is a drive current for driving said first motor, and said second control element is a drive current for driving said second motor.

13. The load abnormality detection apparatus as claimed in claim 1, wherein said first control element is a torque command value for driving said first motor, and said second control element is a torque command value for driving said second motor.

14. An image forming apparatus comprising: the load abnormality detection apparatus as claimed in claim 1; an intermediate transfer belt configured to serve as said first rotation member; and a secondary transfer roller configured to serve as said second rotation member.

15. A computer readable recording medium storing a load abnormality detection program causing a computer to function as the load abnormality detection apparatus as claimed in claim 1.

16. A load abnormality detection apparatus that detects a load abnormality in at least one of a first rotational member and a second rotational member provided in an apparatus including: the first rotational member and the second rotational member that act on each other; a first motor that drives said first rotational member and is controlled based on a first control element; and a second motor that drives said second rotational member and is controlled based on a second control element, said load abnormality detection apparatus comprising: an element acquisition part configured to acquire said first control element and said second control element; an inclination calculation part configured to calculate an inclination of change in said second control element; a first comparison part configured to compare said first control element with a first threshold value and also compare said first control element with a second threshold value larger than said first threshold value; a second comparison part configured to determine whether the inclination of change in said second control element is a positive value or zero or a negative value, and compare an absolute value of the inclination of change in said second control element with a seventh threshold value, which is a positive value; and an abnormality detection part configured to detect a load abnormality in a load applied to at least one of said first rotational member and said second rotational member based on results of comparison by said first comparison part and said second comparison part and identify a cause of the detected load abnormality.

17. The load abnormality detection apparatus as claimed in claim 16, wherein, when said first control element is smaller than said first threshold value and the inclination of change in said second control element is equal to or smaller than zero, said abnormality detection part identifies that a cause of said load abnormality is a first peculiar cause of said first rotational member.

18. The load abnormality detection apparatus as claimed in claim 16, wherein said first control element is a drive current for driving said first motor, and said second control element is a drive current for driving said second motor.

19. The load abnormality detection apparatus as claimed in claim 16, wherein said first control element is a torque command value for driving said first motor, and said second control element is a torque command value for driving said second motor.

20. An image forming apparatus comprising: the load abnormality detection apparatus as claimed in claim 16; an intermediate transfer belt configured to serve as said first rotation member; and a secondary transfer roller configured to serve as said second rotation member.

* * * * *